(12) United States Patent
Artwohl et al.

(10) Patent No.: US 10,240,388 B2
(45) Date of Patent: Mar. 26, 2019

(54) DISPLAY CASE DOOR ASSEMBLY WITH TEMPERED GLASS VACUUM PANEL

(71) Applicant: ANTHONY, INC., Sylmar, CA (US)

(72) Inventors: Paul J. Artwohl, Stevensville, MI (US); Jeffery W. Nicholson, Palmdale, CA (US); Matthew Rolek, Sylmar, CA (US); Mark Sandnes, Sylmar, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

(21) Appl. No.: 15/357,456

(22) Filed: Nov. 21, 2016

(65) Prior Publication Data

US 2017/0138116 A1    May 18, 2017

Related U.S. Application Data

(63) Continuation of application No. 15/058,898, filed on Mar. 2, 2016, now Pat. No. 9,498,072, which is a
(Continued)

(51) Int. Cl.
   *E06B 3/673* (2006.01)
   *A47F 3/00* (2006.01)
   (Continued)

(52) U.S. Cl.
   CPC .......... *E06B 3/67339* (2013.01); *A47F 3/001* (2013.01); *A47F 3/002* (2013.01);
   (Continued)

(58) Field of Classification Search
   CPC .................................................. E06B 3/67339
   See application file for complete search history.

(56) References Cited

U.S. PATENT DOCUMENTS 2,959,493 A   11/1960   Vincent
3,441,924 A    4/1969   Peek et al.
(Continued)

FOREIGN PATENT DOCUMENTS

FR         2777762      10/1999
WO      WO 96/12862      5/1996
WO     WO 2008/029801    3/2008

OTHER PUBLICATIONS

Extended European Search Report for Application No. 15151666.3 (107939-0229), Dated Jul. 2, 2015, 8 pages.
(Continued)

*Primary Examiner* — Daniel H Lee
(74) *Attorney, Agent, or Firm* — Fish & Richardson P.C.

(57) ABSTRACT

A display case door assembly for a temperature-controlled storage device includes an opening into the temperature-controlled storage device and a vacuum panel mounted within the opening. The vacuum panel includes a first vacuum pane of tempered glass, a second vacuum pane of tempered glass, and an evacuated gap between the first and second vacuum panes. The evacuated gap has a predetermined thickness within which a vacuum is drawn, thereby providing a thermal insulation effect for the vacuum panel. The vacuum panel further includes a plurality of spacers disposed within the evacuated gap and configured to maintain the predetermined thickness of the evacuated gap when the vacuum is drawn therein.

13 Claims, 26 Drawing Sheets

Related U.S. Application Data continuation-in-part of application No. 14/563,760, filed on Dec. 8, 2014.

(60) Provisional application No. 61/938,555, filed on Feb. 11, 2014.

(51) Int. Cl.

| | | |
|---|---|---|
| *A47F 3/04* | (2006.01) | |
| *E06B 3/66* | (2006.01) | |
| *E04B 1/80* | (2006.01) | |
| *E06B 3/663* | (2006.01) | |
| *E05F 1/06* | (2006.01) | |
| *E05D 11/00* | (2006.01) | |
| *E06B 3/677* | (2006.01) | |

(52) U.S. Cl.
CPC ........... *A47F 3/005* (2013.01); *A47F 3/0434* (2013.01); *E04B 1/803* (2013.01); *E05D 11/0081* (2013.01); *E05F 1/061* (2013.01); *E06B 3/6612* (2013.01); *E06B 3/6617* (2013.01); *E06B 3/66304* (2013.01); *E06B 3/66309* (2013.01); *E06B 3/66333* (2013.01); *E06B 3/66357* (2013.01); *E06B 3/677* (2013.01); *E05Y 2900/31* (2013.01); *E06B 2003/6638* (2013.01); *E06B 2003/66338* (2013.01); *Y02A 30/25* (2018.01); *Y02B 80/24* (2013.01); *Y10T 428/231* (2015.01)

(56) References Cited

U.S. PATENT DOCUMENTS

| | | | |
|---|---|---|---|
| 3,733,650 A | 5/1973 | Douglas | |
| 3,911,245 A | 10/1975 | O'Shaughnessy | |
| 4,631,777 A | 12/1986 | Takimoto | |
| 4,637,167 A | 1/1987 | Svensson | |
| 4,671,582 A | 6/1987 | Stromquist | |
| 4,683,154 A | 7/1987 | Benson et al. | |
| 4,786,344 A | 11/1988 | Beuther | |
| 4,928,448 A | 5/1990 | Phillip | |
| 4,991,259 A | 2/1991 | Finkelstein et al. | |
| 5,027,574 A | 7/1991 | Phillip | |
| 5,097,642 A | 3/1992 | Richardson et al. | |
| 5,124,185 A | 6/1992 | Kerr et al. | |
| 5,154,953 A | 10/1992 | de Moncuit | |
| 5,255,473 A | 10/1993 | Kaspar | |
| 5,270,084 A | 12/1993 | Parker | |
| 5,643,644 A | 7/1997 | Demars | |
| 5,657,607 A | 8/1997 | Collins et al. | |
| 5,664,395 A | 9/1997 | Collins et al. | |
| 5,891,536 A | 4/1999 | Collins et al. | |
| 5,902,652 A | 5/1999 | Collins et al. | |
| 5,989,659 A | 11/1999 | Kato et al. | |
| 6,052,965 A | 4/2000 | Florentin et al. | |
| 6,071,575 A | 6/2000 | Collins et al. | |
| 6,103,324 A | 8/2000 | Collins et al. | |
| 6,105,336 A | 8/2000 | Katoh et al. | |
| 6,210,763 B1 | 4/2001 | Katoh et al. | |
| 6,261,652 B1 | 7/2001 | Poix et al. | |
| 6,291,036 B1 | 9/2001 | Wang et al. | |
| 6,326,067 B1 | 12/2001 | Veerasamy | |
| 6,336,984 B1 | 1/2002 | Aggas | |
| 6,352,749 B1 | 3/2002 | Aggas | |
| 6,365,242 B1 | 4/2002 | Veerasamy | |
| 6,372,312 B1 | 4/2002 | Aggas | |
| 6,383,580 B1 | 5/2002 | Aggas | |
| 6,387,460 B1 | 5/2002 | Shukuri et al. | |
| 6,399,169 B1 | 6/2002 | Wang et al. | |
| 6,420,002 B1 | 7/2002 | Aggas et al. | |
| 6,435,630 B1 | 8/2002 | Anin et al. | |
| 6,436,492 B1 | 8/2002 | Landa et al. | |
| 6,436,493 B1 | 8/2002 | Asano et al. | |
| 6,444,281 B1 | 9/2002 | Wang et al. | |
| 6,478,911 B1 | 11/2002 | Aggas | |
| 6,479,112 B1 | 11/2002 | Shukuri et al. | |
| 6,497,931 B1 | 12/2002 | Aggas | |
| 6,503,583 B2 | 1/2003 | Nalepka et al. | |
| 6,506,272 B1 | 1/2003 | Aggas | |
| 6,541,083 B1 | 4/2003 | Landa et al. | |
| 6,541,084 B2 | 4/2003 | Wang | |
| 6,558,494 B1 | 5/2003 | Wang et al. | |
| 6,606,832 B2 | 8/2003 | Richardson et al. | |
| 6,606,833 B2 | 8/2003 | Richardson et al. | |
| 6,635,321 B2 | 10/2003 | Wang et al. | |
| 6,641,689 B1 | 11/2003 | Aggas | |
| 6,663,923 B2 | 12/2003 | Futagami et al. | |
| 6,689,241 B1 | 2/2004 | Delhorme et al. | |
| 6,692,600 B2 | 2/2004 | Veerasamy et al. | |
| 6,701,575 B2 | 3/2004 | Padiak et al. | |
| 6,701,749 B2 | 3/2004 | Wang et al. | |
| 6,946,171 B1 | 9/2005 | Aggas | |
| 6,955,026 B2 | 10/2005 | Misonou | |
| 7,081,178 B2 | 7/2006 | Collins | |
| 7,114,306 B2 | 10/2006 | Minaai et al. | |
| 7,141,130 B2 | 11/2006 | Minaai et al. | |
| 7,244,480 B2 | 7/2007 | Minaai et al. | |
| 7,449,227 B2 | 11/2008 | Echigoya et al. | |
| 7,553,527 B2 | 6/2009 | Minaai | |
| 7,722,956 B2 | 5/2010 | Collins | |
| 7,833,592 B2 | 11/2010 | Pilloy | |
| 7,845,142 B2 | 12/2010 | Theios | |
| 7,851,034 B2 | 12/2010 | Cooper | |
| 7,919,157 B2 * | 4/2011 | Cooper | E06B 3/6612 428/34 |
| 7,929,194 B2 | 4/2011 | Legois et al. | |
| 8,137,494 B2 | 3/2012 | Cooper et al. | |
| 8,182,887 B2 | 5/2012 | Jones | |
| 8,202,587 B2 | 6/2012 | Wang | |
| 8,227,055 B2 | 7/2012 | Wang | |
| 8,377,524 B2 | 2/2013 | Theios et al. | |
| 8,377,525 B2 | 2/2013 | Cooper et al. | |
| 8,434,904 B2 | 5/2013 | Alvarez | |
| 8,460,493 B2 | 6/2013 | Cooper | |
| 8,492,788 B2 | 7/2013 | Veerasamy et al. | |
| 8,500,933 B2 | 8/2013 | Cooper | |
| 8,506,738 B2 | 8/2013 | Wang et al. | |
| 8,512,829 B2 | 8/2013 | Cooper | |
| 8,512,830 B2 | 8/2013 | Bettger et al. | |
| 8,590,343 B2 | 11/2013 | Wang | |
| 8,613,161 B2 | 12/2013 | Nicholson et al. | |
| 8,899,471 B2 | 2/2014 | Li et al. | |
| 8,899,472 B2 | 2/2014 | Li et al. | |
| 8,679,271 B2 | 3/2014 | Veerasamy et al. | |
| 8,679,598 B2 | 3/2014 | Veerasamy et al. | |
| 8,679,599 B2 | 3/2014 | Grzybowski et al. | |
| 8,733,128 B2 | 5/2014 | Dennis | |
| 8,742,287 B2 | 6/2014 | Dear | |
| 8,763,427 B2 | 7/2014 | Wang | |
| 8,794,033 B2 | 8/2014 | Dear | |
| 8,821,999 B2 | 9/2014 | Grzybowski et al. | |
| 8,833,105 B2 | 9/2014 | Dennis et al. | |
| 8,840,007 B2 | 9/2014 | Li | |
| 8,900,679 B2 | 12/2014 | Theios et al. | |
| 8,950,162 B2 | 2/2015 | Miller et al. | |
| 8,955,358 B2 | 2/2015 | Grzybowski et al. | |
| 8,984,909 B2 | 3/2015 | Li et al. | |
| 9,010,149 B2 | 4/2015 | Jeon et al. | |
| 9,169,155 B2 | 10/2015 | Dennis et al. | |
| 9,187,947 B2 | 11/2015 | Raggio | |
| 9,221,707 B2 | 12/2015 | Wang et al. | |
| 9,498,072 B2 | 11/2016 | Artwohl | |
| 2002/0035852 A1 | 3/2002 | Wang | |
| 2003/0066256 A1 | 4/2003 | DeBlock | |
| 2003/0124296 A1 | 7/2003 | Smith | |
| 2009/0139165 A1 | 6/2009 | Prete | |
| 2011/0089802 A1 | 4/2011 | Cording | |
| 2013/0142972 A1 | 6/2013 | Raggio | |
| 2013/0202821 A1 | 8/2013 | Son et al. | |
| 2013/0255317 A1 | 10/2013 | Cooper | |
| 2013/0291594 A1 | 11/2013 | Cooper | |
| 2013/0316099 A1 | 11/2013 | Miller et al. | |
| 2013/0323441 A1 | 12/2013 | Dennis et al. | |

(56) References Cited

U.S. PATENT DOCUMENTS

| | | |
|---|---|---|
| 2014/0162000 A1 | 6/2014 | Son et al. |
| 2014/0182774 A1 | 7/2014 | Grzybowski et al. |
| 2014/0186557 A1 | 7/2014 | Grzybowski et al. |
| 2014/0212605 A1 | 7/2014 | Son et al. |
| 2014/0335291 A1 | 11/2014 | Hasegawa et al. |
| 2014/0356558 A1 | 12/2014 | Hasegawa et al. |
| 2015/0079313 A1 | 3/2015 | Vogel-Martin et al. |
| 2015/0184446 A1 | 7/2015 | Veerasamy et al. |
| 2015/0218032 A1 | 8/2015 | Hogan et al. |
| 2015/0218042 A1 | 8/2015 | Hogan et al. |
| 2015/0223619 A1 | 8/2015 | Artwohl et al. |
| 2015/0233174 A1 | 8/2015 | Stark |
| 2015/0337591 A1 | 11/2015 | Koga et al. |
| 2016/0166085 A1 | 6/2016 | Twohy |
| 2017/0245660 A1 | 8/2017 | Artwohl et al. |

OTHER PUBLICATIONS

International Search Report and Written Opinion in International Application No. PCT/US2017/020223, dated May 22, 2017, 12 pages.

\* cited by examiner

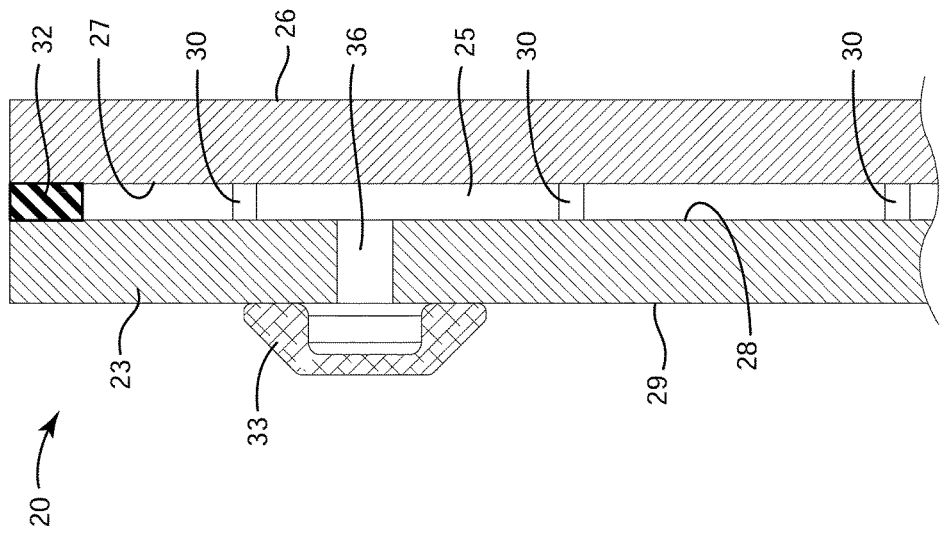
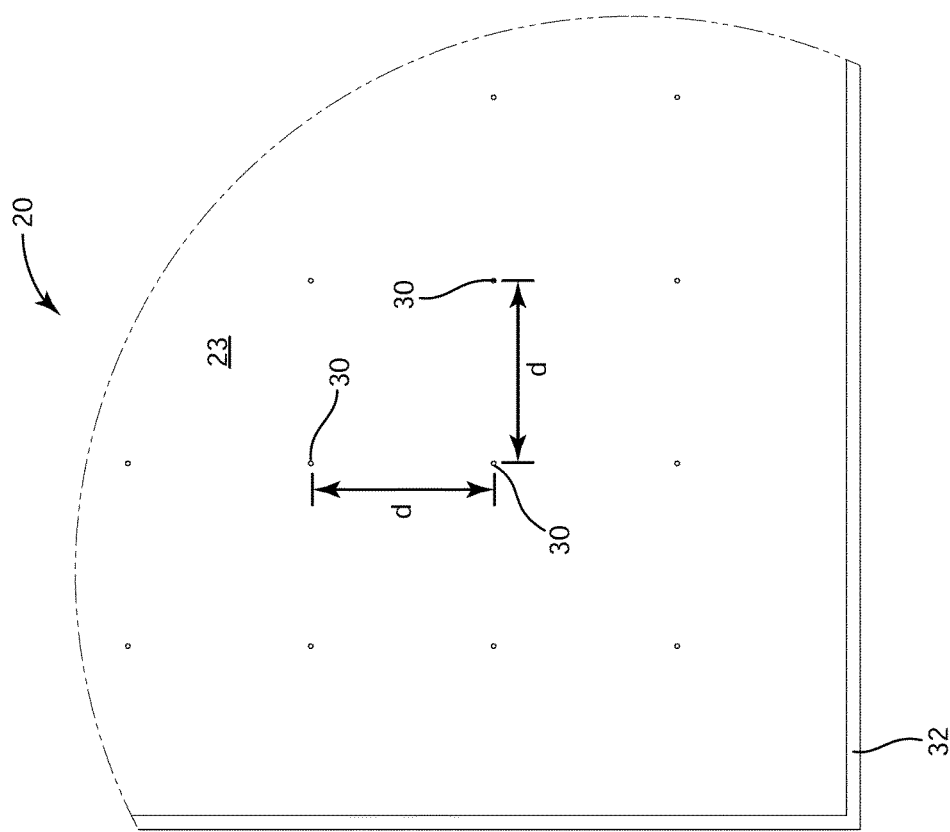
FIG. 7D
FIG. 7C

DISPLAY CASE DOOR ASSEMBLY WITH TEMPERED GLASS VACUUM PANEL

CROSS-REFERENCE TO RELATED PATENT APPLICATIONS

This application is a continuation of U.S. patent application Ser. No. 15/058,898 filed Mar. 2, 2016, which is a continuation-in-part of U.S. patent application Ser. No. 14/563,760 filed Dec. 8, 2014, which claims the benefit of and priority to U.S. Provisional Patent Application No. 61/938,555 filed Feb. 11, 2014. The entireties of U.S. patent application Ser. No. 15/058,898, U.S. patent application Ser. No. 14/563,760, and Provisional Patent Application No. 61/938,555 are incorporated by reference herein.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the present invention and is not admitted to be prior art by inclusion in this section.

Temperature-controlled storage devices (e.g., a refrigerator, freezer, refrigerated merchandiser, display case, etc.) are used in a wide variety of commercial, institutional, and residential applications for storing and/or displaying refrigerated or frozen objects. Many temperature-controlled storage devices have a display case door (e.g., a door with an insulated glass panel) through which objects within the temperature-controlled storage device can be viewed.

Conventional insulated glass panels typically include multiple parallel panes with a layer of gas between the panes. The gas is generally air or a noble gas (e.g., Argon, Krypton, etc.) which functions as a thermal insulator to reduce heat transfer through the panel. In conventional insulated glass panels, the pressure of the air or gas between the panes is equal or substantially equal to atmospheric pressure. Reducing the pressure of the air or gas between the panes would cause atmospheric pressure to apply a large force (e.g., thousands of pounds of force) to the surface of the panel. Such a force is likely to bend or break an insulated glass panel, especially if the panel is relatively thin.

Vacuum insulated glass is a type of insulated glass panel which uses an evacuated space or gap between parallel panes of glass as an insulating layer. The manufacture of vacuum insulated glass typically involves sealing parallel panes of glass to each other at their edges (e.g., using glass solder) and drawing a vacuum in a thin gap between the parallel panes. Such a manufacturing process requires the panes of glass to be held at a high temperature while the edge seal is formed in order to ensure proper bonding.

Conventional vacuum insulated glass panels use panes of non-tempered glass. Non-tempered glass typically has an improved flatness relative to tempered glass, which allows the gap between panes to have a substantially uniform thickness. However, non-tempered glass is typically more fragile than tempered glass and fractures into larger shards when broken. Using tempered glass in a vacuum insulated glass panel could have significant durability and safety advantages. However, the typical manufacturing process used to create vacuum insulated glass panels prevents the use of tempered glass because the high temperatures used to form the edge seal removes any tempering from the glass. For these reasons, a vacuum insulated glass panel constructed from tempered glass has not been successfully implemented.

SUMMARY

One implementation of the present disclosure is a display case door assembly for a temperature-controlled storage device. The display case door assembly includes an opening into the temperature-controlled storage device and a vacuum panel mounted within the opening. The vacuum panel includes a first vacuum pane of tempered glass, a second vacuum pane of tempered glass, and an evacuated gap between the first and second vacuum panes. The evacuated gap has a predetermined thickness within which a vacuum is drawn, thereby providing a thermal insulation effect for the vacuum panel. The vacuum panel further includes a plurality of spacers disposed within the evacuated gap and configured to maintain the predetermined thickness of the evacuated gap when the vacuum is drawn therein.

In some embodiments, the display case door assembly includes a perimeter seal bonding a perimeter of the first vacuum pane to a perimeter of the second vacuum pane and providing a hermetic seal within the evacuated gap. The perimeter seal may have a melting temperature below a glass transition temperature of the tempered glass. The perimeter seal may be bonded to the perimeter of the first vacuum pane and the perimeter of the second vacuum pane by heating the perimeter seal to the melting temperature without detempering the tempered glass. In some embodiments, the first vacuum panel and the second vacuum panel are bonded together using an ultrasonic welding process which forms a hermetic seal between the first vacuum panel and the second vacuum panel without detempering the tempered glass.

In some embodiments, the predetermined thickness of the evacuated gap is less than 1 millimeter. In some embodiments, the predetermined thickness of the evacuated gap is approximately 0.2 millimeters. In some embodiments, the plurality of spacers are arranged in a grid and separated from each other by a distance approximately 250 times the predetermined thickness of the evacuated gap. In some embodiments, the plurality of spacers are arranged in a grid and separated from each other by a distance of approximately 50 millimeters.

In some embodiments, at least one of the first vacuum pane and the second vacuum pane is made of a low emissivity material configured to reduce radiation heat transfer through the vacuum panel. In some embodiments, the display case door assembly includes a protective layer laminated to an outside surface of the vacuum panel and configured to prevent the vacuum panel from breaking into a plurality of uncontained shards. In some embodiments, the display case door assembly includes a film or coating laminated to a surface of the vacuum panel. The film or coating may include at least one of an anti-condensate layer, an ultraviolet inhibiting layer, and a low emissivity layer.

Another implementation of the present disclosure is a vacuum panel for a temperature-controlled storage device. The vacuum panel includes a first vacuum pane of tempered glass, a second vacuum pane of tempered glass, and an evacuated gap between the first and second vacuum panes. The evacuated gap has a predetermined thickness within which a vacuum is drawn, thereby providing a thermal insulation effect for the vacuum panel. The vacuum panel further includes a plurality of spacers disposed within the evacuated gap and configured to maintain the predetermined thickness of the evacuated gap when the vacuum is drawn therein.

In some embodiments, the vacuum panel includes a perimeter seal bonding a perimeter of the first vacuum pane to a perimeter of the second vacuum pane and providing a hermetic seal within the evacuated gap. The perimeter seal may have a melting temperature below a glass transition temperature of the tempered glass. The perimeter seal may be bonded to the perimeter of the first vacuum pane and the perimeter of the second vacuum pane by heating the perimeter seal to the melting temperature without detempering the tempered glass. In some embodiments, the first vacuum panel and the second vacuum panel are bonded together using an ultrasonic welding process which forms a hermetic seal between the first vacuum panel and the second vacuum panel without detempering the tempered glass.

In some embodiments, the predetermined thickness of the evacuated gap is less than 0.5 millimeters. In some embodiments, at least one of the first vacuum pane and the second vacuum pane is made of a low emissivity material configured to reduce radiation heat transfer through the vacuum panel. In some embodiments, the plurality of spacers are arranged in a grid and separated from each other by a distance approximately 250 times the predetermined thickness of the evacuated gap. In some embodiments, the plurality of spacers are arranged in a grid and separated from each other by a distance of approximately 50 millimeters.

Another implementation of the present disclosure is thermally-insulated vacuum panel. The vacuum panel includes a first vacuum pane of tempered glass, a second vacuum pane of tempered glass, an evacuated gap between the first and second vacuum panes providing a thermal insulation effect for the vacuum panel, and a perimeter seal bonding a perimeter of the first vacuum pane to a perimeter of the second vacuum pane. The perimeter seal provides a hermetic seal within the evacuated gap and has a melting temperature below a glass transition temperature of the tempered glass. The perimeter seal is bonded to the perimeter of the first vacuum pane and the perimeter of the second vacuum pane by heating the perimeter seal to the melting temperature without detempering the tempered glass.

BRIEF DESCRIPTION OF THE DRAWINGS

FIG. 7C is a detail view of a portion of the vacuum panel shown in FIG. 7A, according to an exemplary embodiment.

FIG. 7D is a side cross-sectional view of the vacuum panel shown in FIG. 7A, according to an exemplary embodiment.

DETAILED DESCRIPTION

Overview

Figure 1:
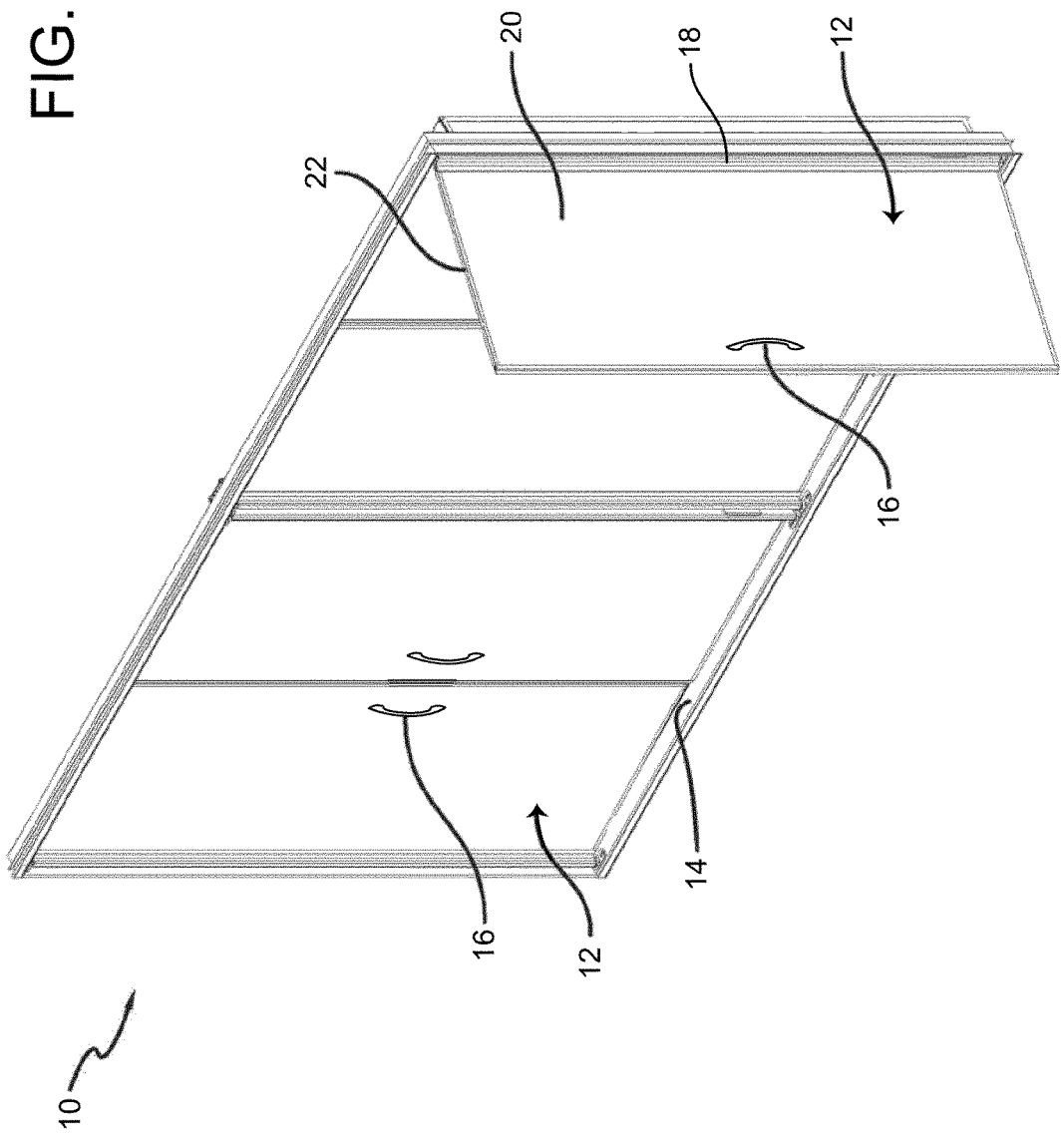
FIG. 1 is a perspective view of a display case door assembly including a door frame and four display case doors coupled to the door frame via a rail assembly, each door having a transparent vacuum panel, according to an exemplary embodiment.
Figure 2:
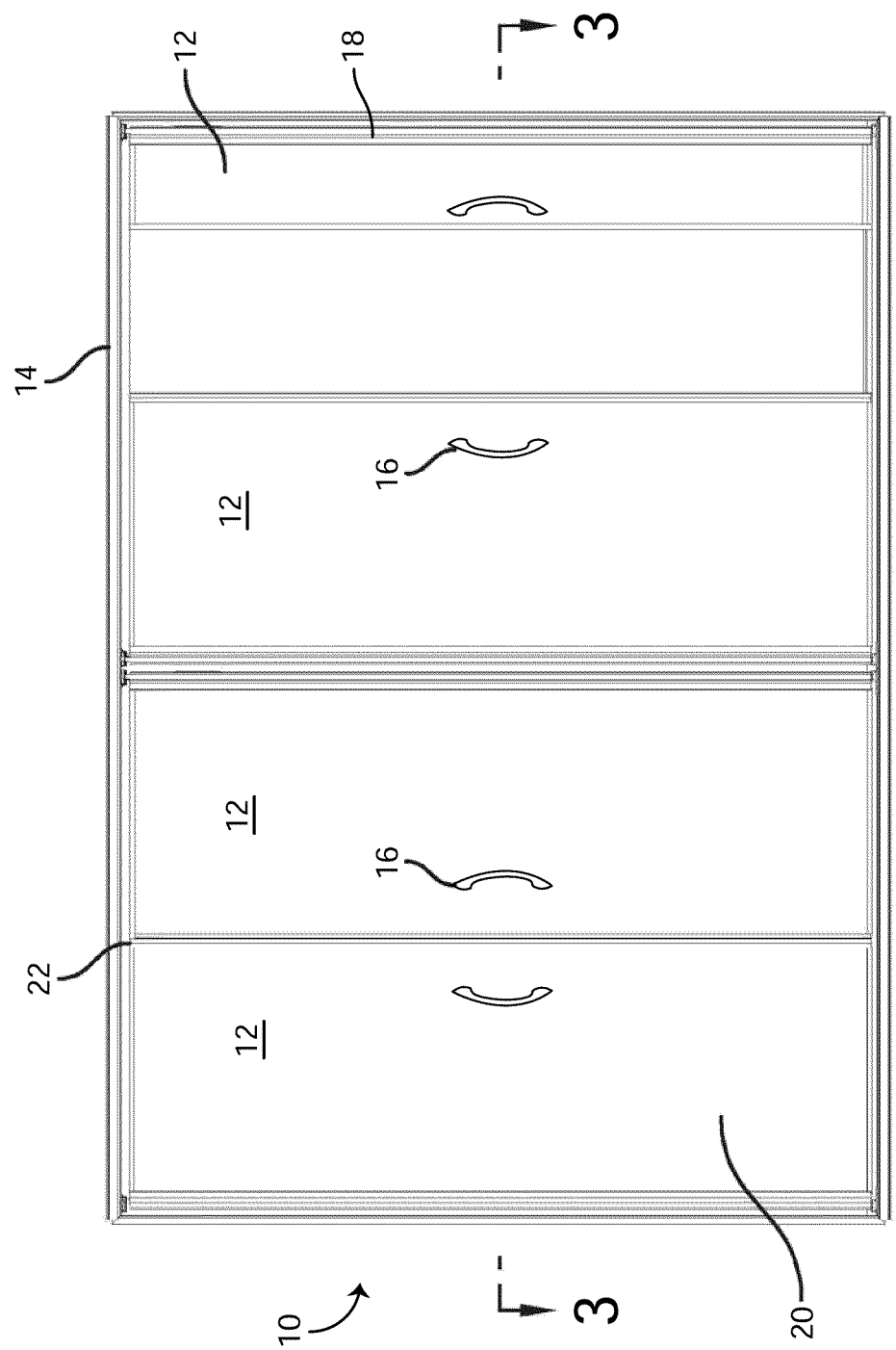
FIG. 2 is a front elevation view of the display case door assembly of FIG. 1, according to an exemplary embodiment.
Figure 3:
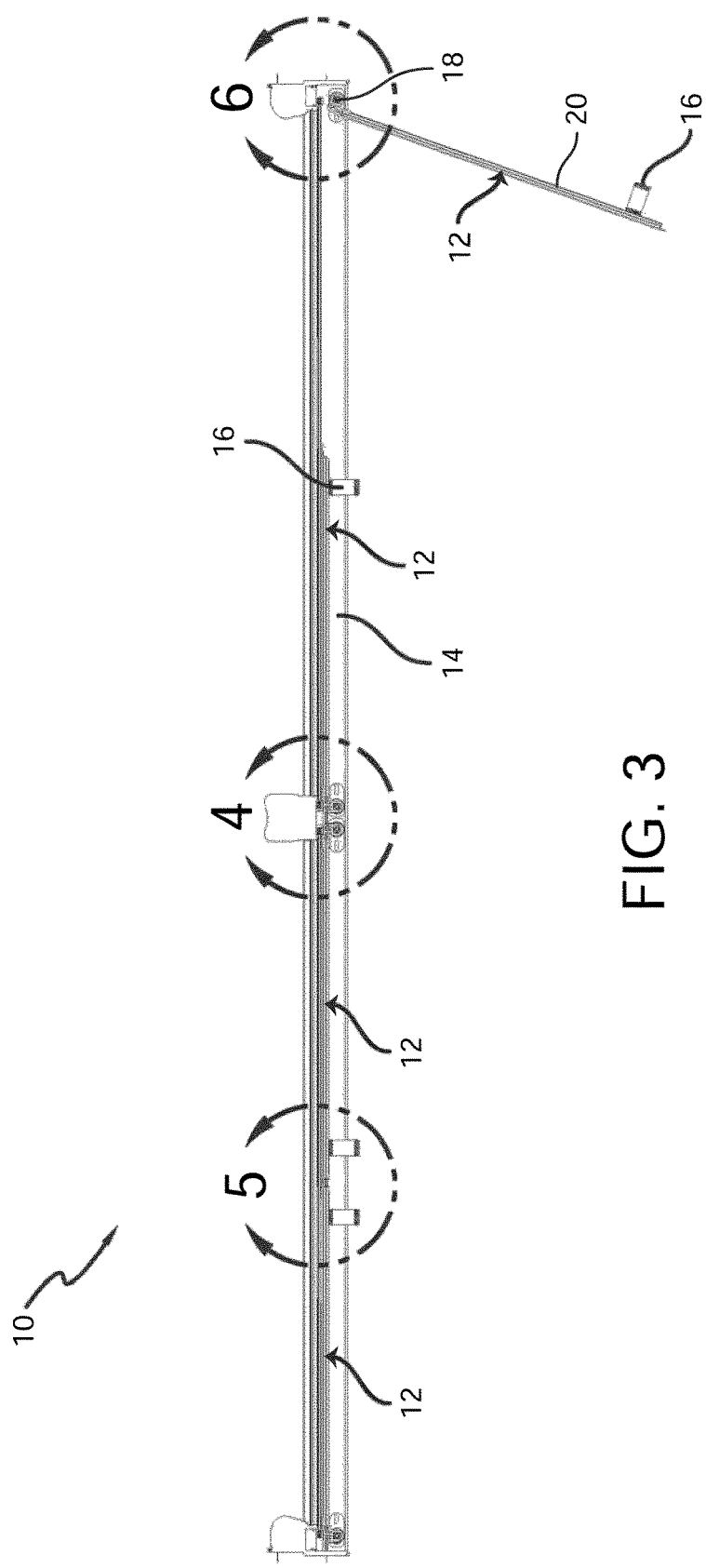
FIG. 3 is a cross-sectional plan view of the display case door assembly of FIG. 1 taken along line 3-3 of FIG. 2, according to an exemplary embodiment.
Figure 4:
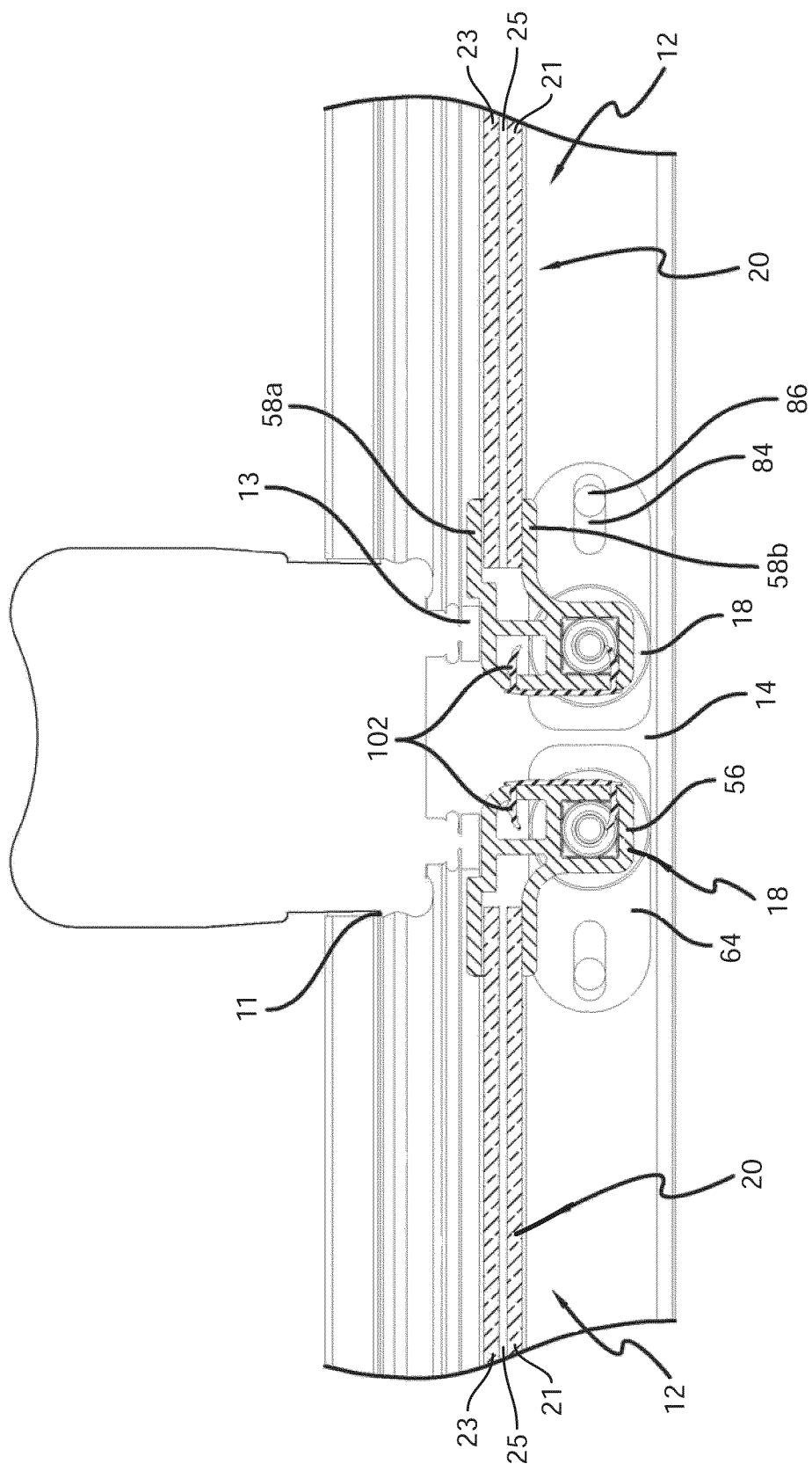
FIG. 4 is a detail taken from FIG. 2 as indicated, according to an exemplary embodiment.

Referring generally to the FIGURES, a display case door assembly with a vacuum panel is shown, according to an exemplary embodiment. The display case door assembly described herein may be used as a door assembly for a refrigerator, freezer, refrigerated merchandiser, or other display case in a wide variety of commercial, institutional, and residential applications. For example, the display case door assembly may be used as part of a temperature-controlled storage device in a supermarket or other similar facility and may include one or more transparent panels or panes (e.g., insulated glass panels) through which objects within the temperature-controlled storage device can be viewed.

The display case door assembly described herein includes a vacuum panel. The vacuum panel may include multiple parallel vacuum panes separated by a small gap (e.g., less than 1 mm, as small as 0.2 mm, etc.). In some embodiments, the gap between the vacuum panes is approximately 0.2 mm. The gap is evacuated to produce a vacuum between the vacuum panes. Advantageously, the vacuum provides a high thermal insulation effect in a relatively small space. In some embodiments, one or more of the panes is made of low emissivity glass to reduce radiation heat transfer through the vacuum panel.

The vacuum panel may include spacers in the evacuated gap to maintain the separation between panes when the gap is evacuated. The spacers prevent external pressure (e.g., atmospheric pressure) from causing the vacuum panes to flex inward when a vacuum is drawn between the panes. In some embodiments, the spacers include a plurality of support pillars between the vacuum panes. The support pillars may be arranged in a grid (e.g., approximately 50 mm apart) and configured to provide internal support for the vacuum panel to counter the pressure differential caused by the evacuated gap.

In some embodiments, one or more of the vacuum panes are made of tempered glass. Advantageously, using tempered glass improves the durability of the vacuum panes relative to non-tempered glass. Since tempered glass is stronger and can withstand more pressure than non-tempered glass without incurring damage, the distance between the spacers can be increased relative to conventional vacuum glass panels that use non-tempered glass. In some embodiments, distance between spacers is approximately 50 mm or 2 inches. Such a distance between spacers would not be feasible for non-tempered glass because it results in less spacers, thereby distributing the compressive force among less spacers and increasing the point forces exerted by spacers on the vacuum panes. If the vacuum panes were made of non-tempered glass, the forces exerted by the spacers could cause damage to the vacuum panes. However, the use of tempered glass allows the spacers to be separated by a greater distance without causing damage to the vacuum panes.

The vacuum panel may include a perimeter seal. The perimeter seal may be solder glass or another sealing material configured to bond the vacuum panes along a perimeter thereof and to provide an airtight (i.e., hermetic) seal within the evacuated gap. In some embodiments, the perimeter seal is made of an inorganic material capable of providing a hermetic seal within the evacuated gap. In some embodiments, the perimeter seal is made of an alloy material specifically formulated for joining glass, silicon, and other types of silicates. For example, the perimeter seal may be a metallic alloy or an active solder which includes tin, silver, and titanium. In some embodiments, the perimeter seal is formed using the "S-BOND® 220M" alloy manufactured by S-Bond Technologies, LLC.

In some embodiments, the perimeter seal is a low-temperature solder or other sealing material that has a melting range significantly lower than the glass transition temperature of the vacuum panes. The relatively lower melting temperature of the perimeter seal allows the perimeter seal to melt and bond to the vacuum panes without heating any portion of the vacuum panes to a temperature that would remove the temper from the glass. In some embodiments, the vacuum panes are bonded together using an ultrasonic welding process. The ultrasonic welding process may be characterized by temperatures well below the glass transition temperature of the vacuum panes. Advantageously, these features allow the vacuum panes to be made of tempered glass and to retain their temper throughout the manufacturing/bonding process. This advantage allows the vacuum panel to include multiple parallel panes of tempered glass bonded together along their perimeter to form a hermetic seal around the evacuated gap.

The vacuum panel described herein provides a thermopane unit that appears as a single pane of glass due to the minimal separation between panes. The separation between panes of glass is minimized by providing an evacuated layer (e.g., a vacuum layer) which creates a thermobreak having a high thermal resistance. The thickness of the evacuated layer can be precisely controlled by providing spacers to maintain the separation between panes. A coating or laminate layer can be used to keep the unit intact if breakage occurs. In a preferred embodiment, coating or layer can also function as an anti-condensate coating and/or UV inhibitor.

Before discussing further details of the display case door and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

Display Case Door Assembly

Referring now to FIGS. 1-6, a display case door assembly 10 is shown, according to an exemplary embodiment. Display case door assembly 10 may be used in conjunction with a temperature-controlled storage device (e.g., a refrigerator, a freezer, a warmer, a heater, etc.) for storing and/or displaying refrigerated or frozen goods. For example, display case door assembly 10 may be implemented as part of a refrigerated display case in a supermarket, warehouse store, or other similar facility.

Display case door assembly 10 is shown to include a plurality of display case doors 12 mounted in a door frame 14. Each display case door 12 includes a vacuum panel 20. In some embodiments, vacuum panel 20 is hingedly connected to frame 14 via a rail 18. In various other embodiments, vacuum panel 20 may be implemented as part of a sliding door or window, a rotary door, a swing sliding door, a fixed-position window or panel, or otherwise positioned within a frame or opening. Vacuum panel 20 may be configured to move relative to the frame or opening (e.g., rotating via hinges as shown in FIG. 1, sliding along a track, etc.) or may be fixed within the frame or opening. In various implementations, vacuum panel 20 may be used as part of a door assembly configured to provide a thermal insulation effect (e.g., for a refrigerated display case) or otherwise used as any type of transparent or substantially transparent panel that provides a thermal insulation effect (e.g., a sliding or hinged window, a fixed-position window, a revolving or sliding door, a hinged door, etc.).

In some embodiments, frame 14 can be omitted to provide a frameless display case door assembly 10. For example, vacuum panel 20 can be mounted within the opening into the temperature-controlled storage device via hinges that directly attach to vacuum panel 20 without requiring an intermediate frame to support and/or contain vacuum panel 20. Advantageously, omitting frame 14 enhances the minimalistic appearance of display case door assembly 10 and supplements the aesthetics provided by vacuum panel 20, which appears as a single pane of glass.

In some embodiments, vacuum panel 20 includes one or more panes of transparent or substantially transparent glass (e.g., insulated glass, non-tempered glass, tempered glass, etc.), plastics, or other transparent or substantially transparent materials. As such, vacuum panel 20 may be referred to as a transparent unit. In some embodiments, vacuum panel 20 includes multiple layers of transparent panes (i.e., multiple panes per door 12). For example, vacuum panel 20 may be a multi-pane unit having a first vacuum pane 21 and a second vacuum pane 23. Vacuum panes 21 and 23 may be separated by a small gap 25 which can be evacuated to draw a vacuum between panes 21 and 23.

Figure 5:
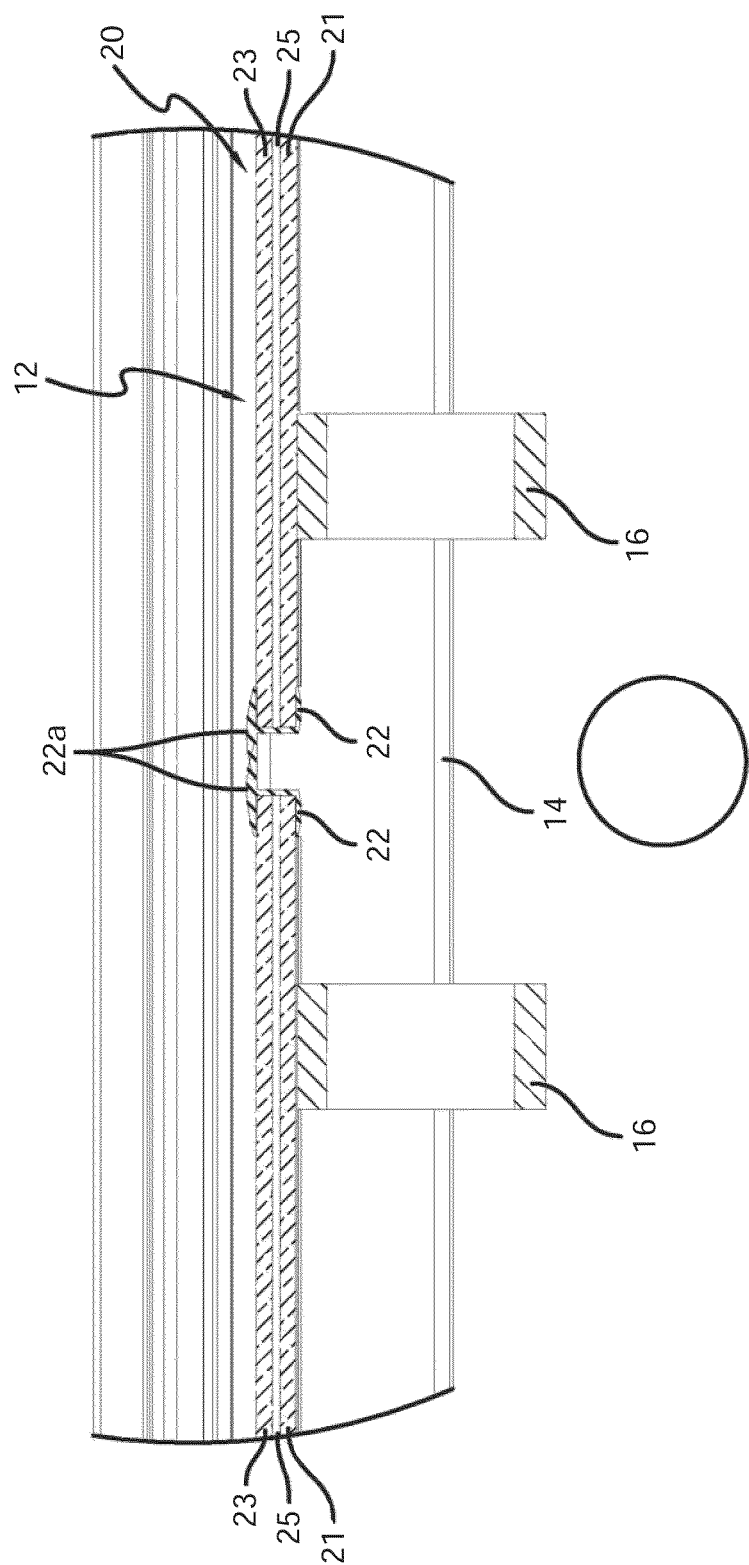
FIG. 5 is a detail taken from FIG. 2 as indicated, according to an exemplary embodiment.
Figure 6:
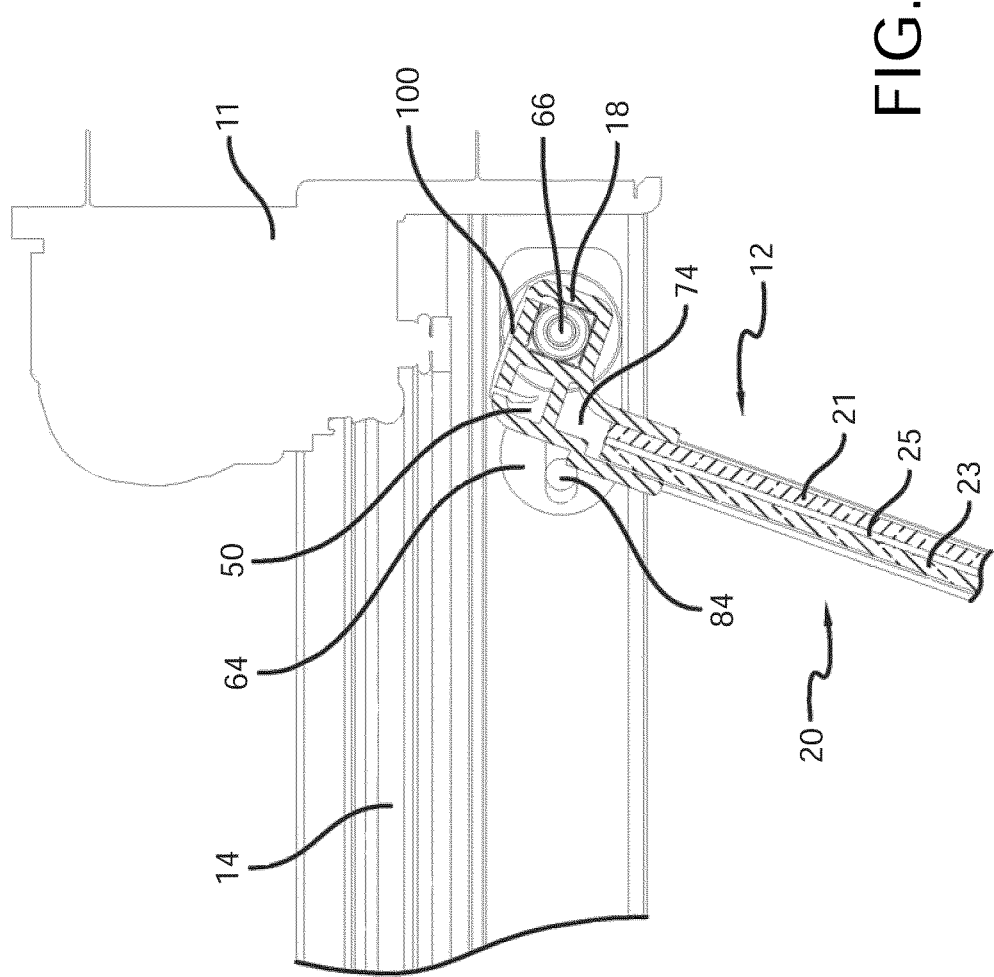
FIG. 6 is a detail taken from FIG. 2 as indicated, according to an exemplary embodiment.

Display case door 12 is shown to include edge guards 22. In some embodiments, edge guards 22 are transparent moldings. Edge guards 22 may be adhered to the top edge, bottom edge, and non-hinge side edge of vacuum panel 20. Silicon or the like may be used for bonding edge guards 22 to the edges of vacuum panel 20. Edge guards 22 provide a sealing feature for display case door 12. For example, as shown in FIG. 5, the edge guard 22 on the non-hinged edge of vacuum panel 20 (i.e., the edge opposite the hinged edge) may include a wiper 22a that cooperates with a wiper 22a on another door 12 to seal the display case when doors 12 are closed. In some embodiments, edge guards 22 can be omitted.

In some embodiments, display case door 12 includes a handle 16. Handle 16 may be used to open, close, lock, unlock, seal, unseal, or otherwise operate display case door 12. Handle 16 may be made from extruded aluminum tubes that are cut to a specified dimension and bonded to a front surface of display case door 12. However, this is not a limitation on the present invention and other handle configurations can be used.

Display case door 12 may include any of a variety of structures or features for attaching display case door 12 to frame 14. For example, display case door 12 may include a structure for housing wiring, a mullion 11, one or more gaskets 13, and/or other associated brackets and components typically included in refrigerated display cases. Detailed descriptions of such components are provided in U.S. Pat. No. 6,606,832, and U.S. Pat. No. 6,606,833, which are incorporated by reference herein in their entireties.

Vacuum Panel

Figure 7B:
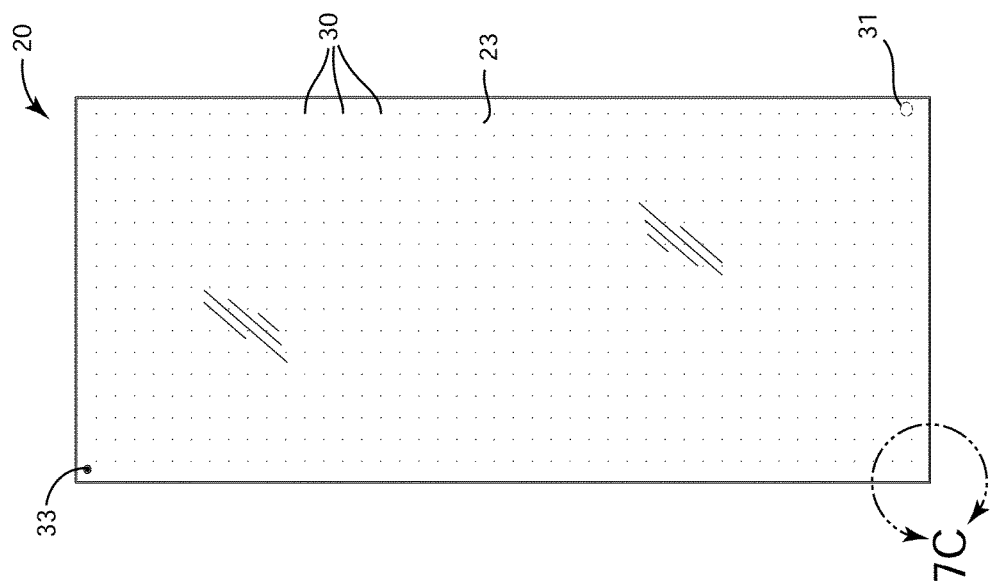
FIG. 7B is a front elevation view of the vacuum panel shown in FIG. 7A, according to an exemplary embodiment.
Figure 7A:
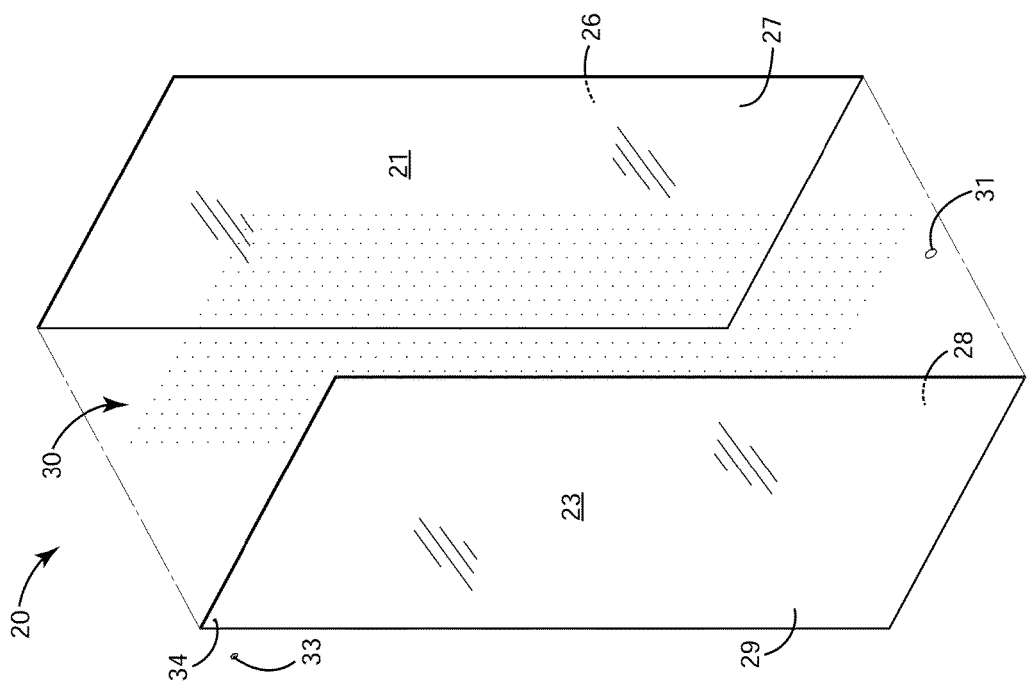
FIG. 7A is an exploded view of the vacuum panel shown in FIG. 1, according to an exemplary embodiment.

Referring now to FIGS. 7A-7D, several drawings illustrating vacuum panel 20 in greater detail are shown, according to an exemplary embodiment. In brief overview, FIG. 7A is an exploded view of vacuum panel 20; FIG. 7B is a front elevation view of vacuum panel 20; FIG. 7C is a detail view of the portion of vacuum panel 20 circled in FIG. 7B; and FIG. 7D is a side cross-section view of vacuum panel 20.

Vacuum panel 20 is shown to include a front vacuum pane 21 and a rear vacuum pane 23. Front vacuum pane 21 has an outside surface 26 and an inside surface 27. Outside surface 26 faces toward a consumer standing in front of the display case when door 12 is closed. Inside surface 27 faces toward merchandise within the display case when door 12 is closed. Rear vacuum pane 23 has an inside surface 28 and an outside surface 29. Inside surface 28 faces toward a consumer standing in front of the display case when door 12 is closed. Outside surface 29 faces toward merchandise within the display case when door 12 is closed. When vacuum panel 20 is assembled, inside surfaces 27 and 28 may be separated from each other by the width of gap 25.

In some embodiments, vacuum panel 20 includes spacers 30 positioned between vacuum panes 21 and 23. Spacers 30 may be configured to maintain the separation between panes 21 and 23 when gap 25 is evacuated. Spacers 30 may prevent external pressure (e.g., atmospheric pressure) from causing panes 21 and 23 to flex inward when a vacuum is drawn in gap 25. In some embodiments, spacers 30 include a plurality of support pillars extending between panes 21 and 23 (i.e., between surfaces 27 and 28). The support pillars may be configured to provide internal compression support for vacuum panel 20 to counter the pressure differential between atmospheric pressure outside panes 21 and 23 and the vacuum within gap 25 between panes 21 and 23. Spacers 30 may be arranged in a grid (e.g., approximately 50 mm apart) between panes 21 and 23. In some embodiments, spacers 30 are ceramic spacers. Spacers 30 can be applied using a printing process or silkscreen process (described in greater detail below) to reduce the time and effort required to properly position spacers 30. For example, one swipe of a silkscreen or an automated printing process can place an entire grid of spacers 30 in proper locations without requiring a user to manually place spacers 30.

In some embodiments, front vacuum pane 21 and rear vacuum pane 23 are made of tempered glass. Advantageously, using tempered glass improves the durability of vacuum panes 21 and 23 relative to non-tempered glass. Using tempered glass also improves the safety of vacuum panel 20 by causing vacuum panes 21 and 23 to fracture into many small pieces in the event that breakage occurs. Since tempered glass is stronger and can withstand more pressure than non-tempered glass without incurring damage, the distance between spacers 30 can be increased relative to conventional vacuum glass panels that use non-tempered glass. For example, a vacuum glass panel manufactured from non-tempered glass may require a relatively small distance between spacers 30 (e.g., 20 mm or less) in order to distribute the compressive force among more spacers 30 and to reduce the point forces exerted by spacers 30 on vacuum panes 21 and 23.

Advantageously, using tempered glass for vacuum panes 21 and 23 allows spacers 30 to be separated by a greater distance d, as shown in FIG. 7C. In some embodiments, distance d is between 20 mm and 80 mm. In some embodiments, distance d is between 40 mm and 60 mm. In some embodiments, distance d is approximately 50 mm or 2 inches. Such a distance between spacers 30 would not be feasible for non-tempered glass because it results in less spacers 30, thereby distributing the compressive force among less spacers 30 and increasing the point forces exerted by spacers 30 on vacuum panes 21 and 23. If vacuum panes 21 and 23 were made of non-tempered glass, the forces exerted by spacers 30 could cause damage to vacuum panes 21 and 23. However, the use of tempered glass allows spacers 30 to be separated by distance d without causing damage to vacuum panes 21 and 23.

Vacuum panel 20 is shown to include a perimeter seal 32. Perimeter seal 32 may be glass solder, ceramic frit, or another sealing material configured to bond panes 21 and 23 along a perimeter thereof and to provide an airtight (i.e., hermetic) seal within gap 25. Perimeter seal 32 can be applied to one or both of vacuum panes 21 and 23 prior to assembly and may extend along an entire perimeter of vacuum panel 20. Perimeter seal 32 may form a closed perimeter (e.g., a rectangle) and may be bonded to both of vacuum panes 21 and 23. Spacers 30 may be contained within the closed perimeter formed by perimeter seal 32.

Perimeter seal 32 may be made of an inorganic material capable of providing a hermetic seal within gap 25. In some embodiments, perimeter seal 32 is made of an alloy material specifically formulated for joining glass, silicon, and other types of silicates. For example, perimeter seal 32 may be a metallic alloy or an active solder which includes tin, silver, and titanium. In some embodiments, perimeter seal 32 is formed using the "S-BOND® 220M" alloy manufactured by S-Bond Technologies, LLC.

In some embodiments, perimeter seal 32 is a ceramic frit made from a granulated or powdered ceramic or glass material. The ceramic frit may be a ceramic composition that has been fused in a fusing oven, quenched to form a glass, and granulated. The ceramic frit may be applied to vacuum panes 21 and/or 23 in the form of a powdered or granulated solid, paste, slurry, suspension, or other composition. In some embodiments, the ceramic frit is bonded to the perimeter of vacuum panes 21 and 23 using a sintering process. The sintering process may involve compacting and forming a solid mass of material by applying heat and/or pressure to the perimeter of vacuum panes 21 and 23 after a layer of the ceramic frit has been applied along the perimeter (e.g., between vacuum panes 21 and 23). The heat applied may be sufficient to bond the ceramic frit to the perimeter of vacuum panes 21 and 23 without heating vacuum panes 21 and 23 to a temperature that would remove the temper from the glass.

In some embodiments, perimeter seal 32 is a low-temperature solder or other sealing material that has a melting range significantly lower than the glass transition temperature of vacuum panes 21 and 23. For example, perimeter seal 32 may have a melting range of approximately 220° C.-280° C., whereas the glass transition temperature of vacuum panes 21 and 23 may be approximately 520° C.-600° C. (i.e., the glass transition temperature for soda lime glass). The relatively lower melting temperature of perimeter seal 32 allows perimeter seal 32 to melt and bond to vacuum panes 21 and 23 without heating any portion of vacuum panes 21-23 to a temperature that would remove the temper from the glass. Advantageously, this allows vacuum panes 21 and 23 to be made of tempered glass and to retain their temper throughout the manufacturing/bonding process. This advantage allows vacuum panel 20 to include multiple parallel panes of tempered glass (i.e., vacuum panes 21 and 23) bonded together along their perimeter to form a hermetic seal around gap 25.

In some embodiments, vacuum panes 21 and 23 are bonded together using an ultrasonic welding process. Ultrasonic welding is an industrial technique whereby high-frequency ultrasonic acoustic vibrations are locally applied to workpieces being held together under pressure to create a solid-state weld. The main components of an ultrasonic welding system are a high-frequency voltage generator, a converter (i.e., an ultrasonic transducer), a booster, and a welding tool called a sonotrode. The high-frequency voltage generator converts an input voltage into a high frequency voltage, which is transformed by the converter into mechanical oscillations of the same frequency. The booster modifies (i.e., amplifies) the amplitude of vibration based on a signal from a controller. The sonotrode emits the converted energy in the form of mechanical shear waves into the components being welded together (i.e., vacuum panes 21 and 23). During the welding process, the sonotride may be pressed onto an exterior surface of vacuum pane 21 or vacuum pane 23 by a perpendicular force. In some embodiments, the perpendicular force is within the range of 250 N-350 N.

Advantageously, the ultrasonic welding process may be characterized by temperatures well below the glass transition temperature of vacuum panes 21 and 23. For example, the ultrasonic welding process can be performed to form a hermetic seal between vacuum panes 21 and 23 without exposing any portion of vacuum panes 21 and 23 to a temperature that would remove the temper from the glass. This advantage allows vacuum panes 21 and 23 to be made of tempered glass and to retain their temper throughout the ultrasonic welding process. The ultrasonic welding can be performed with or without an intermediate adhesive or solder used to bond vacuum panes 21 and 23. For example, perimeter seal 32 may be used in some embodiments and omitted in other embodiments. If perimeter seal 32 is used, the ultrasonic welding process may be performed to melt and bond perimeter seal 32 to vacuum panes 21 and 23 at a temperature significantly below the glass transition temperature of vacuum panes 21 and 23. If perimeter seal 32 is not used, the ultrasonic welding process may be performed to bond vacuum panes 21 and 23 directly to each other.

In some embodiments, perimeter seal 32 and spacers 30 are formed using a printing process (e.g., 2D or 3D printing, ceramic in-glass printing, etc.) or an additive manufacturing process. For example, a printer (e.g., a dot-matrix printer, a ceramic printer, a 3D printer, etc.) can be used to print a layer of material along the perimeter of vacuum pane 21 and/or vacuum pane 23 to form perimeter seal 32. The printer can also be used to print columns or dots of material to form a grid of spacers 30 at the locations shown in FIGS. 7B-7C. In various embodiments, perimeter seal 32 and spacers 30 may be formed using different materials or the same material. For example, the printer may be configured to print a layer of a first material along the perimeter of vacuum panes 21 and/or 23 to form perimeter seal 32, and a layer of a second material to form spacers 30 at the locations shown in FIGS. 7B-7C. The different materials/layers may be printed sequentially or concurrently using a printer that can switch between printing different materials.

In some embodiments, perimeter seal 32 and spacers 30 are formed using a glass printing process. The glass printing process may include using an in-glass printer and/or digital ceramic inks to print perimeter seal 32 and/or spacers 30 onto a surface of vacuum pane 21 and/or vacuum pane 23. Exemplary in-glass printers and digital ceramic inks may which may be used to perform the glass printing process may include those manufactured by Dip-Tech Digital Printing Technologies Ltd. The glass printing process may include printing a layer of ceramic ink onto vacuum pane 21 and/or vacuum pane 23, drying the ceramic ink (e.g., using a blower or dryer), placing vacuum panes 21 and 23 in parallel with each other with the layer of ceramic ink between vacuum panes 21 and 23, and tempering the assembly to fuse the ceramic ink to both vacuum panes 21 and 23.

Vacuum panel 20 is shown to include a vacuum port 34. Vacuum port 34 may be used to remove air from gap 25 after vacuum panel 20 has been assembled to draw a vacuum within gap 25. In various embodiments, vacuum port 34 may extend through vacuum pane 21 or vacuum pane 23. Vacuum port 34 may be formed (e.g., drilled, cut, etc.) prior to tempering vacuum panes 21 and 23 to avoid damage that could result from forming a vacuum port in tempered glass. After vacuum port 34 is formed, vacuum panes 21 and 23 may be tempered. A cap 33 may be used to cover vacuum port 34 once the vacuum has been drawn within gap 25. Cap 33 can be adhered to outside surface 29 or 26 using any of a variety of adhesives or sealing materials. In some embodiments, cap 33 is adhered using the same material used to form perimeter seal 32.

In some embodiments, vacuum panel 20 includes a getter 31 located within gap 25. Getter 31 may be a reactive material configured to remove small amounts of gas from gap 25. For example, getter 31 may be configured to combine chemically with gas molecules within gap 25 or may remove the gas molecules by adsorption. Advantageously, getter 31 helps to form and maintain the vacuum within gap 25 by removing any gas molecules not removed via vacuum port 34 or which leak into gap 25 over time. In some embodiments, getter 31 is inserted into gap 25 in a preformed condition. In other embodiments, getter 31 can be printed onto vacuum panel 21 or 23 along with perimeter seal 32 and/or spacers 30.

In some embodiments, one or more of surfaces 26-29 have a film or coating applied thereto. For example, one or more of surfaces 26-29 may have an anti-condensate film or coating (e.g., a pyrolitic coating, a mylar coating, etc.) which may be used to prevent condensation from occurring. In one embodiment, the anti-condensate film or coating is applied to surface 29. In some embodiments, the film or coating applied to surface 29 prevents the contamination of merchandise in the temperature-controlled storage device in the event that vacuum panels 21 and/or 23 are damaged (e.g., by containing glass shards). In other embodiments, the anti-condensate coating can be applied to any of surfaces 26-29 or to a surface of another pane or panel of vacuum panel 20. For example, the anti-condensate coating can be applied to an optional safety panel located adjacent to surface 26 and/or surface 29. The anti-condensate coating can be applied by spraying, adhering, laminating, or otherwise depositing the coating (e.g., using chemical vapor deposition or any other suitable technique). In some embodiments, the anti-condensate coating is made of a self-healing material (e.g., urethane) and is capable of healing scratches.

In some embodiments, the anti-condensate coating is an electrically-conductive coating. To provide electricity to the coating, vacuum panel 20 may include parallel bus bars (e.g., top and bottom, left and right side, etc.). The bus bars may be spaced apart from one another and adhered to the electrically-conductive coating. Each bus bar may include a lead assembly or solder tab for adhering wires that are in communication with an electrical source. In this arrangement, electric current may pass through one of the lead assemblies, to a first of the bus bars, across the electrically-conductive coating to the second bus bar, and through the other lead assembly. The electric current may cause heat to be generated across panes 21 and/or 23 (e.g., due to electrical resistance of the coating), which may assist in preventing condensation on panes 21 and/or 23. An exemplary bus bar system is described in greater detail in U.S. Pat. Nos. 6,606,832, and 6,606,833, which are incorporated by reference herein for their descriptions thereof. The bus bars and the electrically-conductive coating may be components of a heating element configured to apply heat to vacuum panel 20. The heating element may be used to prevent condensation when vacuum panel 20 is implemented in humid environments and/or when vacuum panel 20 is used to provide thermal insulation between spaces having relatively large temperature differences. For example, the heating element may be used when vacuum panel 20 is implemented as part of a freezer door.

In some embodiments, display case door 12 is configured to maximize visible light transmission from inside the case to the customer, thereby improving the ability of customers to view display items. However, it is also desirable to minimize the transmission of non-visible light (i.e., ultraviolet and infrared light) through vacuum panel 20 from outside to inside the case in order to improve thermal performance (e.g., by reducing radiation heat transfer) and to protect items therein. In some embodiments, an anti-reflective coating may be applied to one or both of vacuum panes 21 and 23. The anti-reflective coating may absorb or transmit infrared light, ultraviolet light, or any combination thereof. In some embodiments, the anti-reflective coating may absorb or transmit some frequencies of visible light in addition to infrared and/or ultraviolet light.

In some embodiments, display case door 12 may be configured to use non-visible wavelengths of light to heat vacuum panel 20, thereby reducing or preventing condensation. For example, one or both of vacuum panes 21 and 23 may include an ultraviolet (UV) inhibitor. A UV inhibitor may increase the shelf life of products within the temperature-controlled storage device by preventing ultraviolet light from passing through vacuum panel 20. The ultraviolet light may be absorbed or reflected by the UV inhibitor and may be used as a source of energy to heat vacuum panel 20. As another example, one or more panes of vacuum panel 20 may be treated with a low-emissivity heat-reflective coating to improve overall thermal resistance (e.g., by reducing radiation heat transfer) and/or to prevent external condensation.

Advantageously, vacuum panel 20 is a thermopane unit that appears as a single pane of glass due to the minimal separation (e.g., 0.2 mm) between vacuum panes 21 and 23. The minimal separation is achieved by providing an evacuated gap 25 between vacuum panes 21 and 23, which creates a thermobreak having a high thermal resistance. The thickness of gap 25 can be precisely controlled by providing spacers 30 to maintain the separation between panes 21 and 23.

Figure 7G:
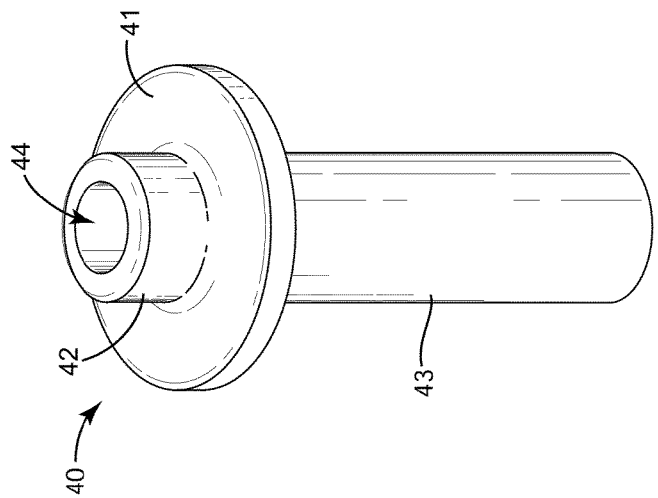
FIG. 7G is a perspective view of the vacuum tube shown in FIG. 7E, according to an exemplary embodiment.
Figure 7E:
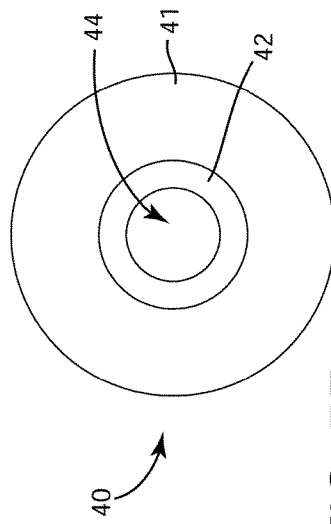
FIG. 7E is a top view of a vacuum tube which may be used to draw a vacuum within the vacuum panel, according to an exemplary embodiment.
Figure 7F:
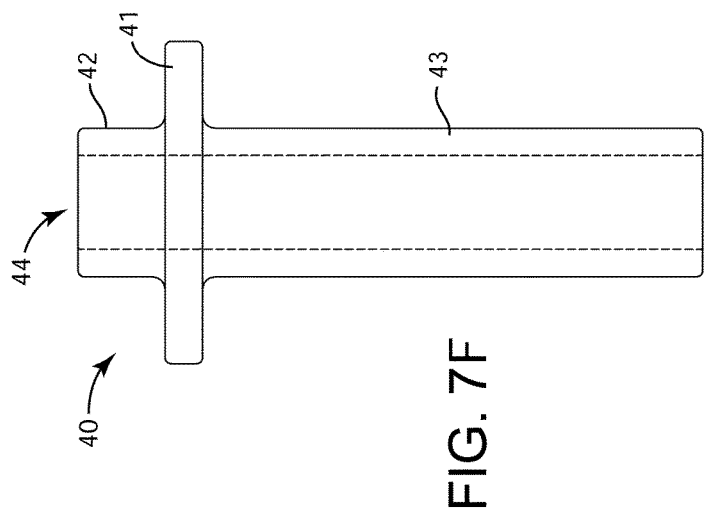
FIG. 7F is a front cross-sectional view of the vacuum tube shown in FIG. 7E, according to an exemplary embodiment.

Referring now to FIGS. 7E-7G, several drawings of a vacuum tube 40 are shown, according to an exemplary embodiment. FIG. 7E is a top view of vacuum tube 40; FIG. 7F is a front cross-sectional view of vacuum tube 40; and FIG. 7G is a perspective view of vacuum tube 40. Vacuum tube 40 may be used to pump air out of gap 25 via vacuum port 34. For example, vacuum tube 40 may be inserted into vacuum port 34 and may be configured to attach to an external vacuum pump. In some embodiments, vacuum tube 40 is made of a soft copper material. In other embodiments, vacuum tube 40 may be made of glass.

Vacuum tube 40 is shown as a cylindrical tube having a bore 44 extending axially therethrough. Vacuum tube 40 includes a radial flange 41 projecting from an outer circumferential surface of vacuum tube 40 and dividing vacuum tube 40 into a first portion 42 and a second portion 43. In some embodiments, flange 41 is offset from the center of vacuum tube 40 such that the axial length of first portion 42 is shorter than the axial length of second portion 43. Vacuum tube 40 may be fused or bonded to vacuum pane 21 or 23 such that first portion 42 or second portion 42 is located within vacuum port 34. In some embodiments, vacuum tube 40 is bonded to vacuum pane 21 or 23 using the same material that forms perimeter seal 32 (e.g., S-Bond solder).

Figure 7I:
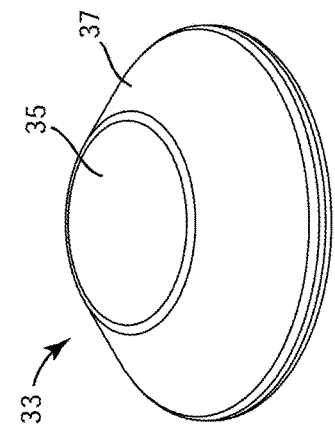
FIG. 7I is a perspective view of the cap shown in FIG. 7H, according to an exemplary embodiment.
Figure 7K:
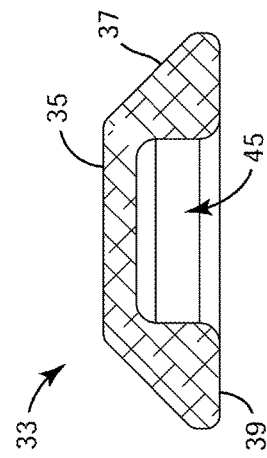
FIG. 7K is a side cross-sectional view of the cap shown in FIG. 7H, according to an exemplary embodiment.
Figure 7H:
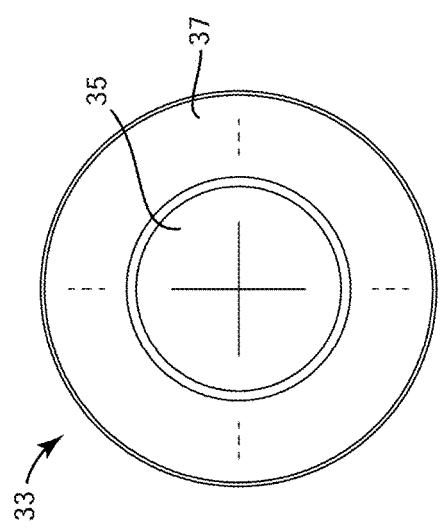
FIG. 7H is a top view of a cap which may be used to cover a vacuum port in the vacuum panel, according to an exemplary embodiment.
Figure 7J:
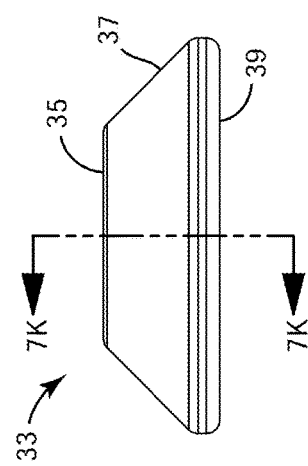
FIG. 7J is a front view of the cap shown in FIG. 7H, according to an exemplary embodiment.

Referring now to FIGS. 7H-7K, several drawings illustrating cap 33 in greater detail are shown, according to an exemplary embodiment. FIG. 7H is a top view of cap 33; FIG. 7I is a perspective view of cap 33; FIG. 7J is a front view of cap 33; and FIG. 7K is a side cross-sectional view of cap 33. Cap 33 is shown having a frustoconical shape including a top circular surface 35, a bottom circular surface 39, and a side surface 37 connecting top surface 35 and bottom surface 39. Top surface 35 and bottom surface 39 may be parallel surfaces offset from each other and concentrically aligned. In some embodiments, top surface 35 is smaller than bottom surface 39. Side surface 37 may be oriented at an oblique angle (e.g., approximately 45 degrees) relative to top surface 35 and bottom surface 39.

As shown in FIG. 7K, a cylindrical bore 45 may extend partially through cap 33. Bore 45 may have a diameter that is substantially equal to the outer diameter of vacuum tube 40 such that first portion 42 or second portion 43 can be received in bore 45. In various embodiments, cap 33 may be made of a metal (e.g., aluminum, copper, stainless steel, etc.), ceramic, glass, or other inorganic material capable of maintaining the vacuum within gap 25. Cap 33 may be bonded to vacuum tube 40, vacuum pane 21, and/or vacuum pane 23. For example, the inner surface of bore 45 may be bonded to the outer surface of vacuum tube 40. Bottom surface 39 may be bonded to outside surface 29 of vacuum pane 23 (as shown in FIG. 7D) or to outside surface 26 of vacuum pane 21 (e.g., for embodiments in which vacuum port 34 extends through vacuum pane 21).

Figure 7M:
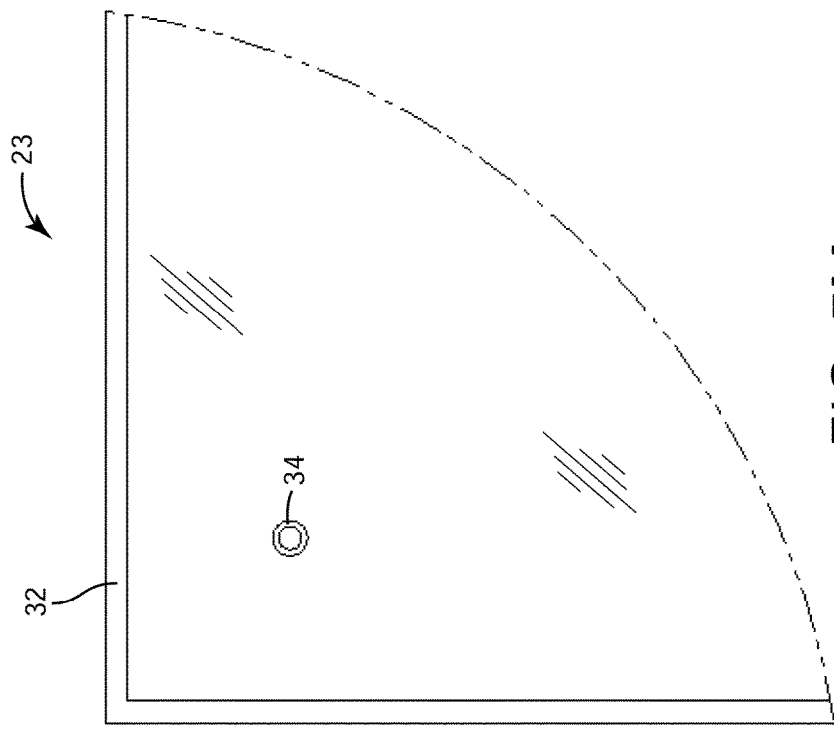
FIG. 7M is a detail view of a portion of the vacuum pane shown in FIG. 7L, according to an exemplary embodiment.
Figure 7L:
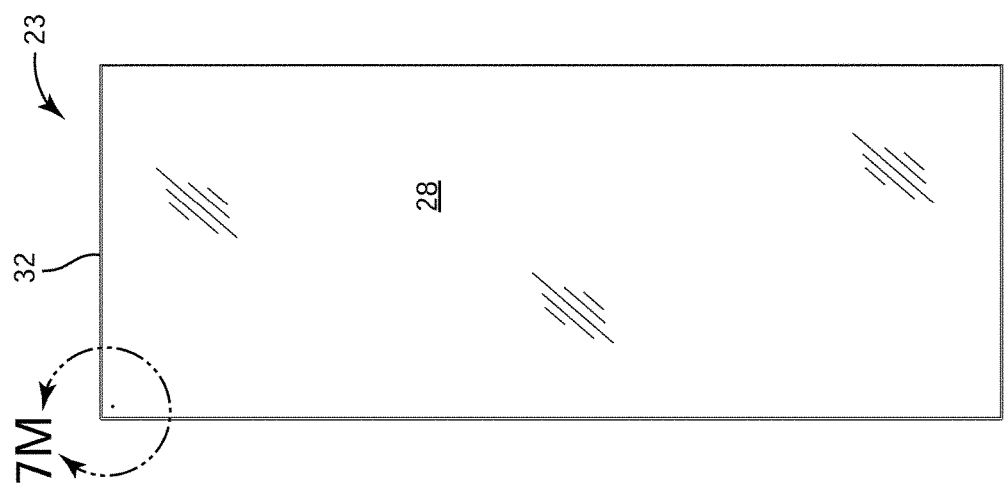
FIG. 7L is a front elevation view of one of the vacuum panes which may be used to form the vacuum panel shown in FIG. 1, according to an exemplary embodiment.

Referring now to FIGS. 7L-7M, vacuum pane 23 is shown in greater detail, according to an exemplary embodiment. FIG. 7L is a front elevation view of vacuum pane 23 and FIG. 7M is a detail view of the portion of vacuum pane 23 highlighted in FIG. 7L. Vacuum pane 23 is shown to include a vacuum port 34 extending through the thickness of the glass (e.g., between surfaces 28 and 29). Vacuum port 34 may be formed prior to tempering vacuum pane 23 to avoid damage that could result from cutting a hole in tempered glass. After vacuum port 34 is formed, vacuum pane 23 may be tempered, along with vacuum pane 21.

Perimeter seal 32 is shown extending along the perimeter of vacuum pane 23. As previously described, perimeter seal 32 may be applied using a printing process. In other embodiments, perimeter seal 32 may be applied by tinning the perimeter of vacuum pane 23 and applying perimeter seal 32 to the tinned portion. Vacuum pane 21 may be the same or similar to vacuum pan 23, with the exception that vacuum pane 21 may not include vacuum port 34. In other embodiments, vacuum port 34 may be formed in vacuum pane 21 (and not vacuum pane 23). One or both of vacuum panes 21 and 23 may include a low-emissivity coating, an anti-condensate coating, a heat-reflective coating, a protective laminate layer, or other types of coatings as previously described.

Figure 7N:
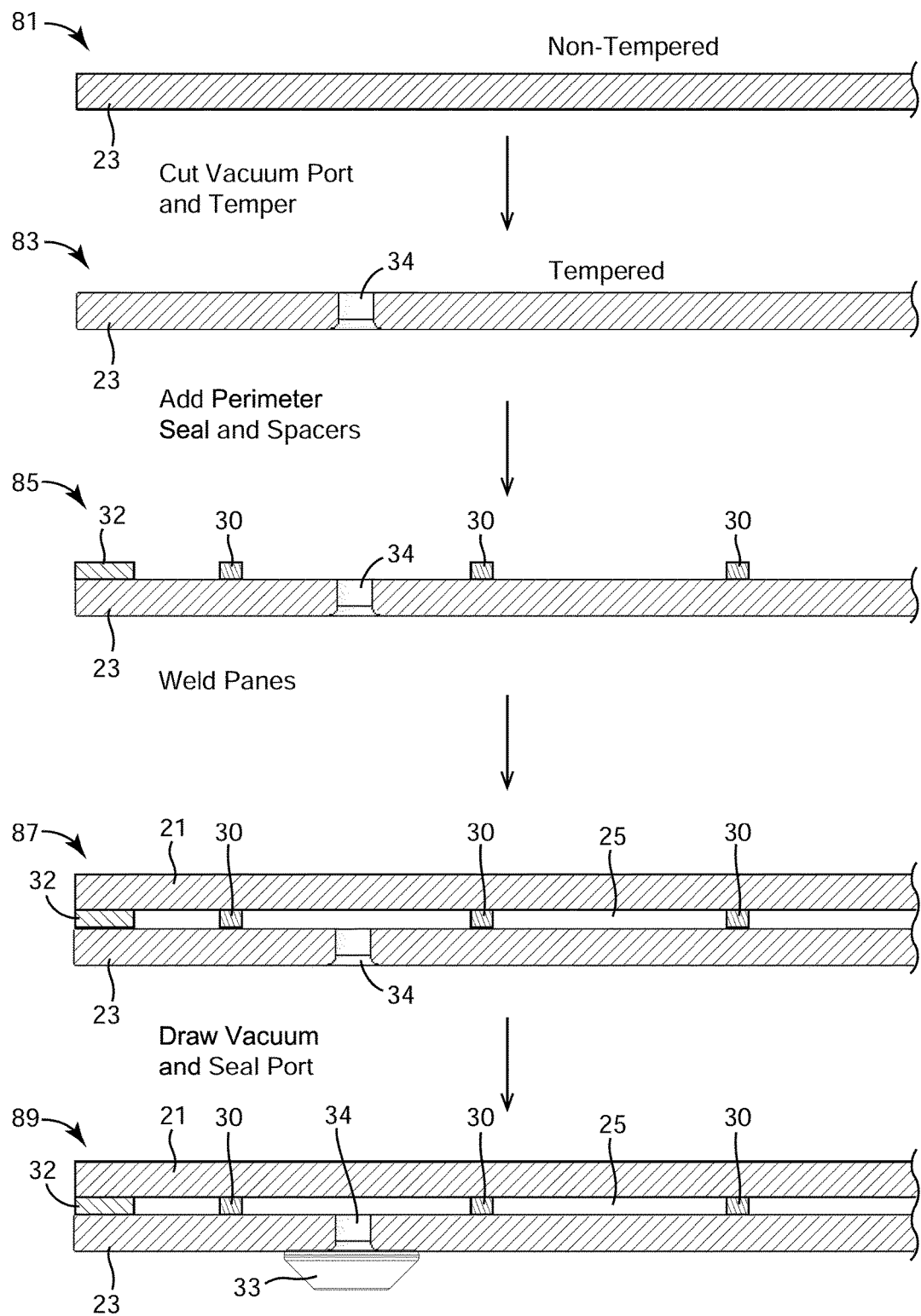
FIG. 7N is a flow diagram illustrating a manufacturing process which may be used to form the vacuum panel shown in FIG. 1, according to an exemplary embodiment.

Referring now to FIG. 7N, a flow diagram illustrating a manufacturing process for vacuum panel 20 is shown, according to an exemplary embodiment. The manufacture of vacuum panel 20 may begin with vacuum pane 23 in a non-tempered condition (stage 81). Prior to tempering vacuum pane 23, vacuum port 34 may be formed (e.g., cut, drilled, etc.) in vacuum pane 23. This allows vacuum port 34 to be formed without damaging vacuum pane 33. After vacuum port 34 is formed, vacuum pane 23 may be tempered, resulting in a tempered pane of glass with a vacuum port 34 extending therethrough (stage 83).

The manufacturing process may include applying perimeter seal 32 and spacers 30 (stage 85). In some embodiments, perimeter seal 32 and spacers 30 are formed using a printing process (e.g., 2D or 3D printing) or an additive manufacturing process as previously described. In other embodiments, the outer perimeter of vacuum pane 23 may be tinned and perimeter seal 32 may be applied to the tinned portion. Perimeter seal 32 may be applied to only vacuum pane 23, only vacuum pane 21, or both vacuum pane 21 and 23 in various embodiments.

Vacuum panes 21 and 23 may be aligned in parallel and welded together (stage 87). In some embodiments, the welding process is an ultrasonic welding process. In some embodiments, the welding process involves heating the perimeter of vacuum panes 21 and 23 to a temperature sufficient to melt perimeter seal 32. As previously described, perimeter seal 32 may be a low-temperature solder or other sealing material that has a melting range significantly lower than the glass transition temperature of vacuum panes 21 and 23. For example, perimeter seal 32 may have a melting range of approximately 220° C.-280° C., whereas the glass transition temperature of vacuum panes 21 and 23 may be approximately 520° C.-600° C. (i.e., the glass transition temperature for soda lime glass). The relatively lower melting temperature of perimeter seal 32 allows perimeter seal 32 to melt and bond to vacuum panes 21 and 23 without heating any portion of vacuum panes 21-23 to a temperature that would remove the temper from the glass. Advantageously, this allows vacuum panes 21 and 23 to be made of tempered glass and to retain their temper throughout the manufacturing/bonding process.

After vacuum panes 21 and 23 are welded together, a vacuum may be drawn within gap 25 (e.g., using vacuum tube 40) and cap 33 may be applied (stage 89). Cap 33 may be fastened (e.g., attached, bonded, fixed, etc.) to the surface of vacuum pane 23 or vacuum pane 21 to cover vacuum port 34 and maintain the vacuum in gap 25. Cap 33 may be bonded to vacuum tube 40, vacuum pane 21, and/or vacuum pane 23. For example, end cap 33 may be bonded to outside surface 29 of vacuum pane 23 (as shown in FIG. 7N) or to outside surface 26 of vacuum pane 21 (e.g., for embodiments in which vacuum port 34 extends through vacuum pane 21).

Figure 8A:
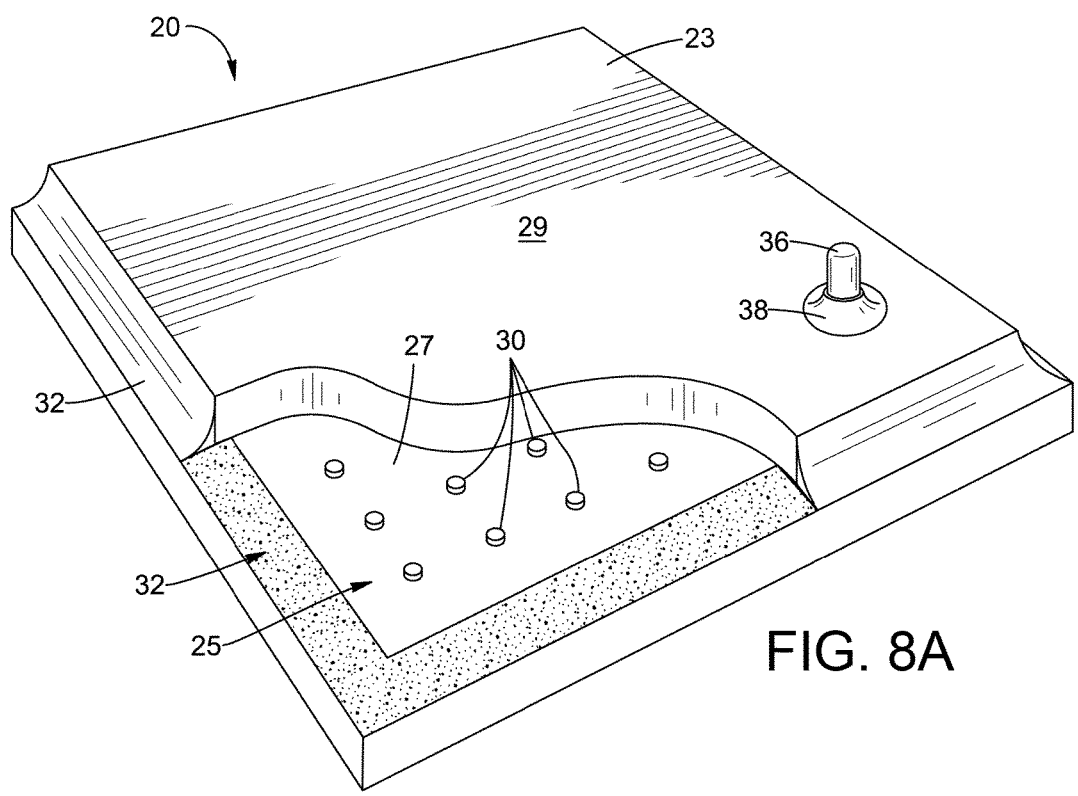
FIG. 8A is a perspective view of the transparent glass unit of FIG. 1, according to an exemplary embodiment.
Figure 8B:
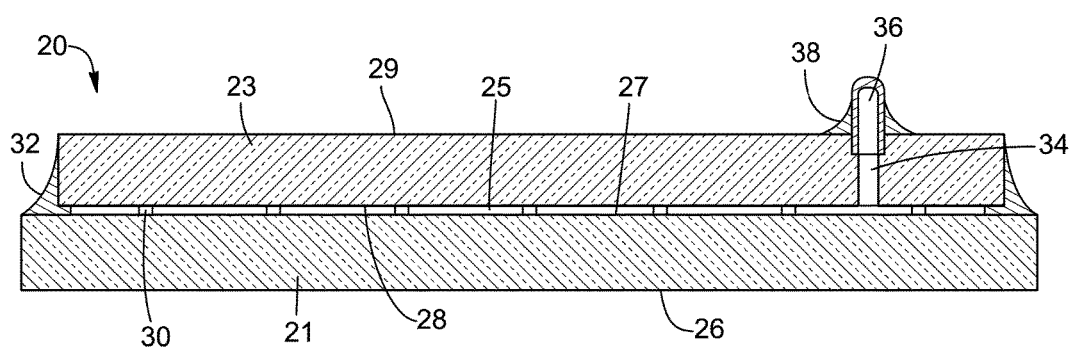
FIG. 8B is a cross-sectional view of the transparent glass unit shown in FIG. 8A, according to an exemplary embodiment.

Referring now to FIGS. 8A and 8B, an assembled version of vacuum panel 20 is shown, according to another exemplary embodiment. As shown in FIG. 8B, vacuum panes 21 and 23 are positioned in parallel and offset from each other by the width of gap 25. The width of gap 25 (e.g., the distance between panes 21 and 23) may be uniform or substantially uniform at various locations between vacuum panes 21 and 23 due to the flatness of vacuum panes 21 and 23.

Still referring to FIG. 8B, a plurality of spacers 30 are shown positioned within gap 25. Spacers 30 may be configured to maintain the separation between vacuum panes 21 and 23 when gap 25 is evacuated. Spacers 30 may prevent external pressure (e.g., atmospheric pressure) from causing vacuum panes 21 and 23 to flex inward when a vacuum is drawn in gap 25. In some embodiments, spacers 30 include a plurality of support pillars extending between vacuum panes 21 and 23 (e.g., between surfaces 27 and 28). The support pillars may be configured to provide internal support (e.g., compression support) for vacuum panel 20 to counter the pressure differential between atmospheric pressure outside vacuum panes 21 and 23 and the vacuum between panes 21 and 23 (e.g., in gap 25).

As shown in FIG. 8A, spacers 30 may be arranged in a grid (e.g., approximately 50 mm apart) between panes 21 and 23. In some embodiments, spacers 30 are separated from each other by a distance approximately ten times the thickness of gap 25. In some embodiments, each of spacers 30 has a thickness equivalent to the thickness of gap 25 (e.g., approximately 0.2 mm). Spacers 30 may contact surfaces 27 and 28 to ensure that the thickness of gap 25 is maintained. In some embodiments, spacers 30 are cylindrical or substantially cylindrical. Spacers 30 may have a diameter or width of approximately 0.5 mm. Spacers 30 may be transparent or semi-transparent to minimize the visibility thereof.

Still referring to FIGS. 8A and 8B, gap 25 may be sealed around a perimeter of vacuum panes 21 and 23 by perimeter seal 32. Perimeter seal 32 may be, for example, a ceramic frit, glass solder or another sealing material configured to bond vacuum panes 21 and 23 along a perimeter thereof and to provide an airtight seal within gap 25. In some embodiments vacuum pane 23 is smaller than vacuum pane 21. For example, the perimeter of vacuum pane 23 may be circumscribed by the perimeter of vacuum pane 21. Perimeter seal 32 may bond with vacuum pane 23 along the top, bottom, and side surfaces of vacuum pane 23. Perimeter seal 32 may bond with vacuum pane 21 along inside surface 27. Gap 25 may be accessed via a vacuum port 34 extending through one of vacuum panes 21 or 23. For example, as shown in FIG. 8A, vacuum port 34 passes through rear vacuum pane 23 between surfaces 28 and 29. In other embodiments, vacuum port 34 may pass through front vacuum pane 21 or through perimeter seal 32. Vacuum port 34 may be used to remove air from gap 25 (e.g., after perimeter seal 32 is applied) to draw a vacuum in gap 25.

Vacuum port 34 may be capped (e.g., closed, sealed, blocked, etc.) by an end cap 36. End cap 36 may be fastened (e.g., attached, bonded, fixed, etc.) within vacuum port 34 to maintain the vacuum in gap 25. End cap 36 may be sealed to vacuum pane 21 or to vacuum pane 23 by a cap seal 38. Cap seal 38 may be the same or similar to perimeter seal 32. For example, cap seal 38 may be a ceramic frit, glass solder, or another sealing material configured to bond end cap 36 to one or both of vacuum panes 21 and 23 (e.g., bonding to surface 29 or to surface 26).

Rail Assembly

Figure 9:
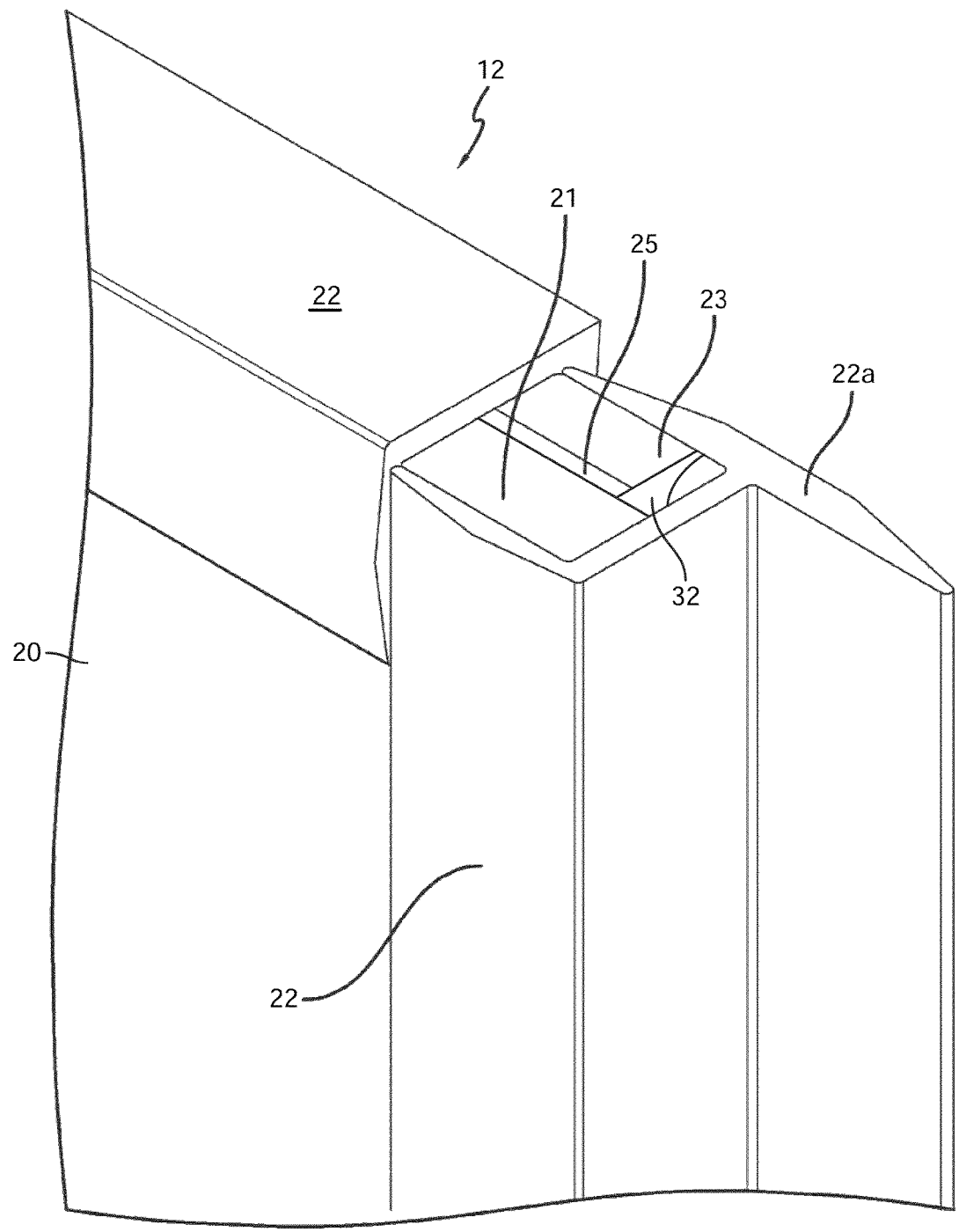
FIG. 9 is a perspective view of the transparent glass unit with edge guards thereon, according to an exemplary embodiment.

Referring now to FIG. 9, vacuum panel 20 is shown with edge guards 22, according to an exemplary embodiment. Edge guards 22 may by open channels (e.g., U-shaped or C-shaped channels) configured to fit over an edge of vacuum panel 20. Edge guards 22 may be adhered to the top edge, bottom edge, and non-hinge side edge of vacuum panel 20. For example, silicon or the like could be used for bonding. In some embodiments, edge guards 22 may be made of a transparent or semi-transparent material to maximize visibility through display case door 12.

Edge guards 22 may provide a sealing feature and may ensure that a person cannot come into contact with any electrically charged surfaces. Preferably, the edge guard 22 on the non-hinged side edge of vacuum panel 20 (e.g., on the right in FIG. 9) includes a wiper 22a that cooperates with a corresponding wiper 22a on an opposite oriented door (as shown in FIG. 5) to seal the temperature-controlled storage device when doors 12 are closed. In another embodiment, edge guards 22 may be omitted.

Figure 10:
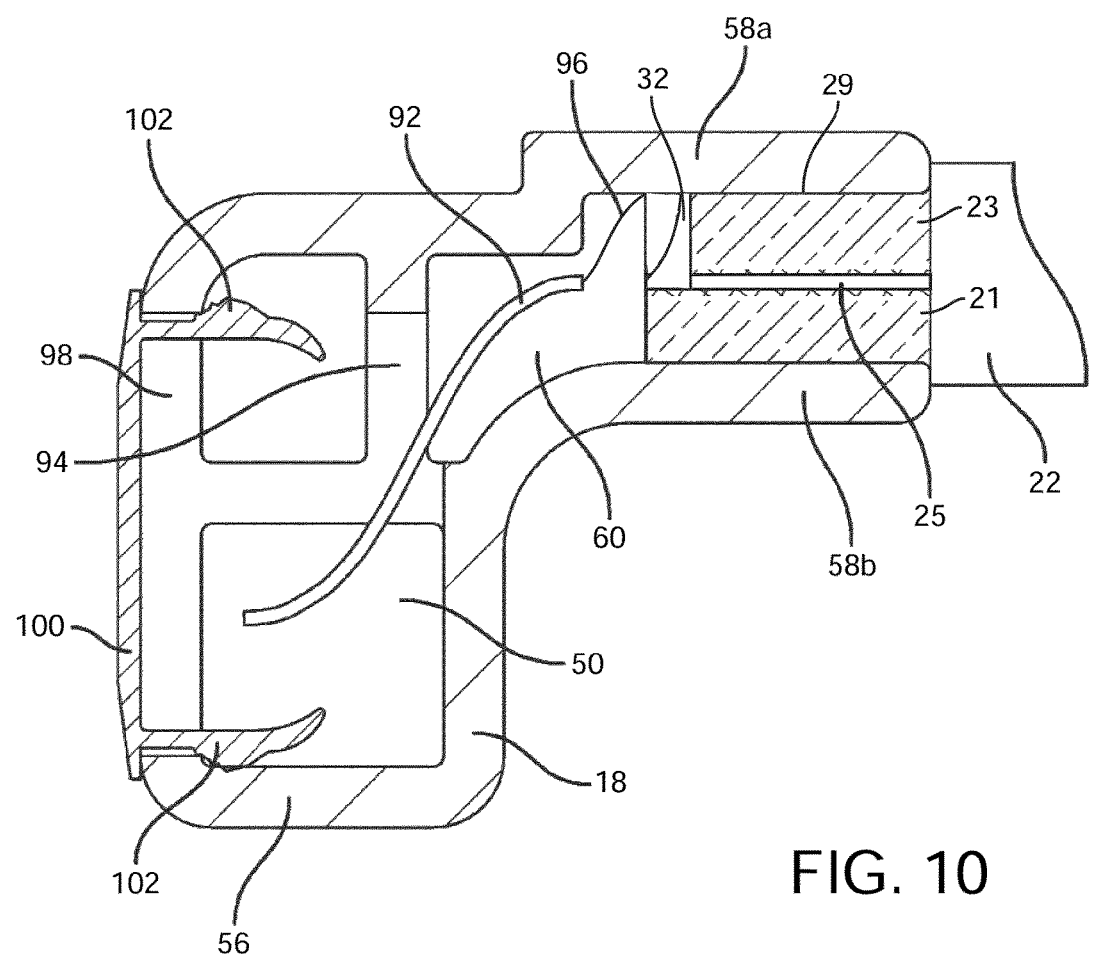
FIG. 10 is a cross-sectional plan view of the rail of the assembly of FIG. 1, according to an exemplary embodiment.
Figure 11:
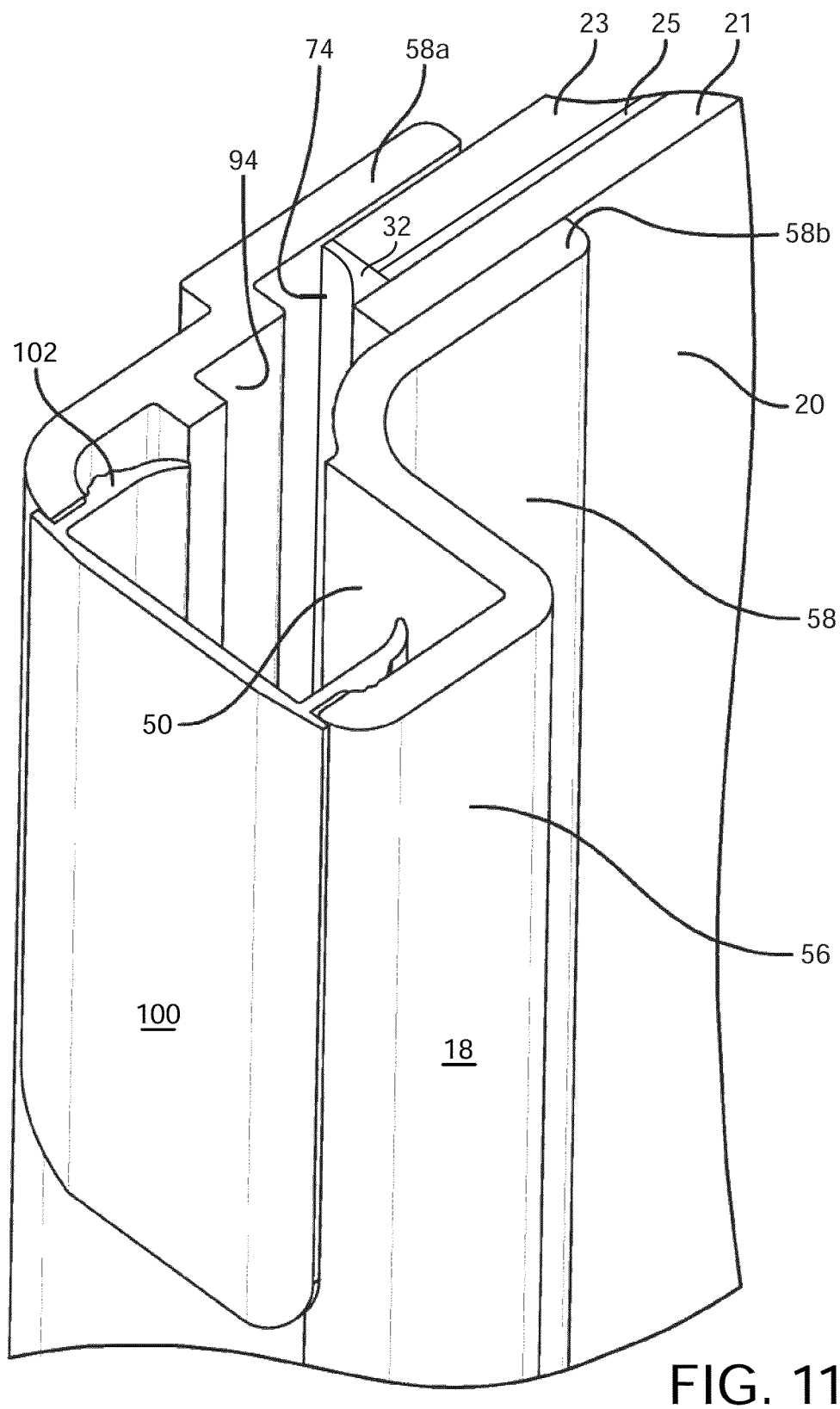
FIG. 11 is a cross-sectional perspective view of the rail of the assembly of FIG. 1, according to an exemplary embodiment.
Figure 12:
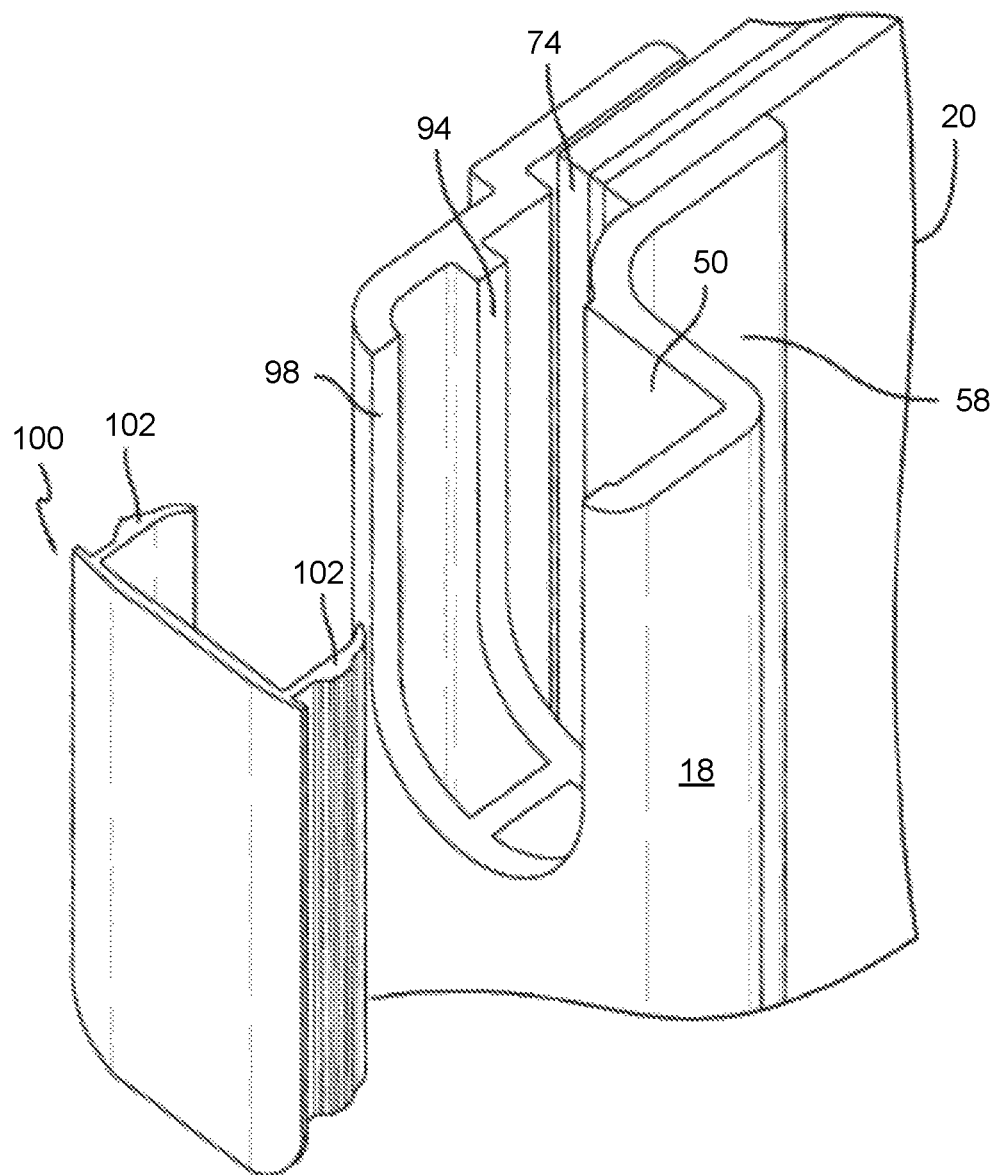
FIG. 12 a is a cross sectional perspective view of the rail of the assembly of FIG. 1 with an access cover removed from an access opening, according to an exemplary embodiment.

Referring now to FIGS. 10-12, vacuum panel 20 is shown secured in rail 18, according to an exemplary embodiment. Rail 18 may attach to vacuum panel 20 along the vertical length of vacuum panel 20. Rail 18 is shown to include a channel 50 having openings at the top and bottom thereof. The openings into channel 50 may be configured to receive hinge pins for hingedly connecting door 12 to frame 14. In a preferred embodiment, display case door assembly 10 includes a gravity hinge 52 at the bottom of channel 50 and an electrical hinge 54 at the top of channel 50 (described in greater detail with reference to FIGS. 13-16). In other embodiments, electrical hinge 54 may be omitted or replaced with a non-electrical hinge.

As shown in FIG. 10, rail 18 may have an "L" shaped cross-section when viewed from the top or the bottom. The "L" shape is shown to include a hinge portion 56 and a vacuum panel receiving portion 58. Vacuum panel receiving portion 58 may include opposing members 58a and 58b that define a channel 74 for receiving and securing vacuum panel 20. In some embodiments, rail 18 is an aluminum extrusion into which vacuum panel 20 is bonded (e.g., using an adhesive such as epoxy or polyurethane). A tape that incorporates an adhesive, such as acrylic or the like may also be used. In other embodiments, a mechanical clamp could be used to secure vacuum panel 20 place. Combinations of a clamp and adhesives or tape could also be used. None of these are a limitation on the present invention. In other embodiments, rail 18 can be made of another material, such as stainless steel or other metal.

Gravity Hinge

Referring now to FIGS. 13-16, those skilled in the art will appreciate the advantages of a gravity hinge, which generally includes a lower portion and an upper portion that rotates about an oblique junction upon the application of a rotational force. As the upper portion rotates, the two portions separate due to the oblique junction. The upper portion "rises" thereby storing potential energy which will cause the upper portion to "fall" or rotate back to a neutral position when the rotational force is terminated. Examples of gravity hinges are shown in U.S. Pat. No. 4,631,777 to Takimoto, U.S. Pat. No. 3,733,650 to Douglas and U.S. Pat. No. 4,991,259 to Finkelstein et al, the entireties of which are incorporated herein by reference.

The gravity hinge 52 of the preferred embodiment includes a lower portion 60 and an upper 62. The lower portion 60 includes a plate 64 having an axial rod 66 extending upwardly therefrom. The upper portion 62 includes a collar 68 and a hinge pin 70 that are axially aligned and cooperate to define an opening 72 for receiving axial rod 66 of lower portion 60. Lower and upper portions 60 and 62 each include a cam track thereon (e.g., cam tracks 60a and 62a, respectively) that cooperate as described below. To secure door 12 on gravity hinge 52, hinge pin 70 is received in an opening at the bottom of channel 50 and rail 18 rests on collar 68.

In a preferred embodiment, the gravity hinge 52 includes a hold open feature. As shown in FIG. 14, cam track 62a on the upper portion 62 includes two peaks 76 and 78, one corresponding to the door closed position 76 and the other corresponding to the door open position 78. These peaks or detents are sized to receive the lower portion's cam track 62a. FIG. 17, shows gravity hinge 52 in the closed position. Preferably, closed peak 76 extends vertically higher than open peak 78. With this arrangement, when a user pushes door 12 from the open position toward the closed position, as a result of gravity and the potential energy stored when the door is in the open position, the door will fall to the closed position. FIG. 17 shows gravity hinge 52 just as the upper portion 62 is about to fall to the closed position. As shown in FIGS. 13-16, peaks 76 and 78 are preferably located about 90° apart, which allows door 12 to be held open at a position about perpendicular to the closed position. However, open detent 78 can be defined at other angles about the collar 68, as desired.

Figure 16:
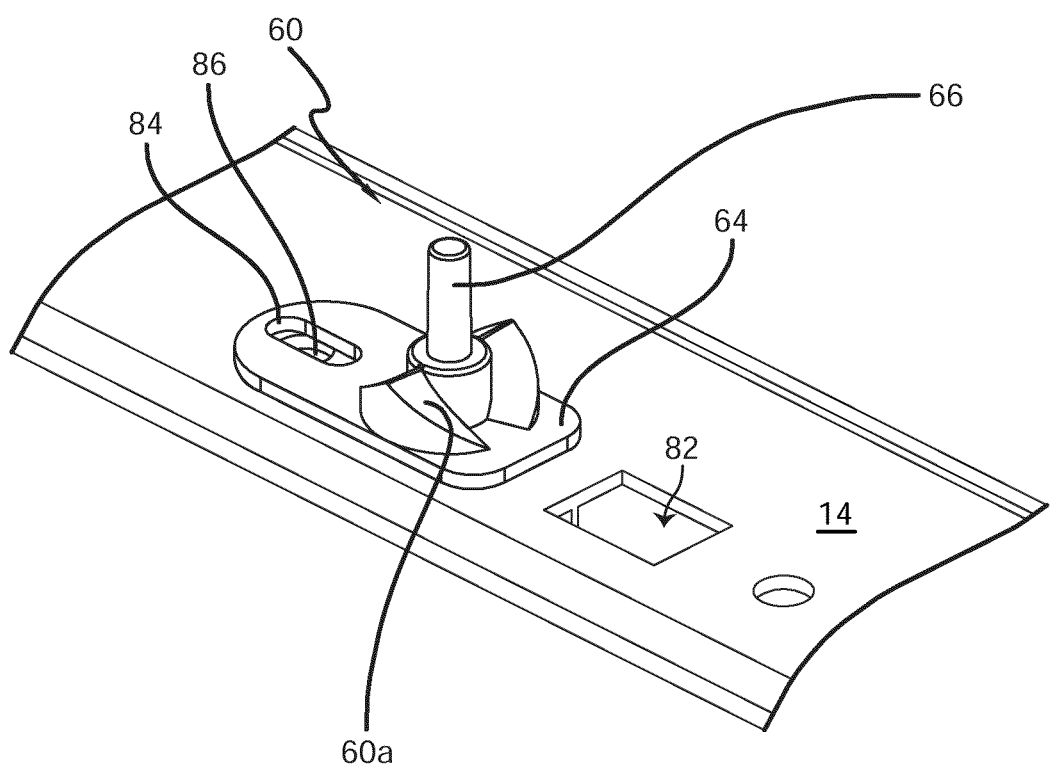
FIG. 16 is a perspective view of a lower portion of the gravity hinge of FIG. 14 mounted in the door frame of FIG. 1, according to an exemplary embodiment.
Figure 17:
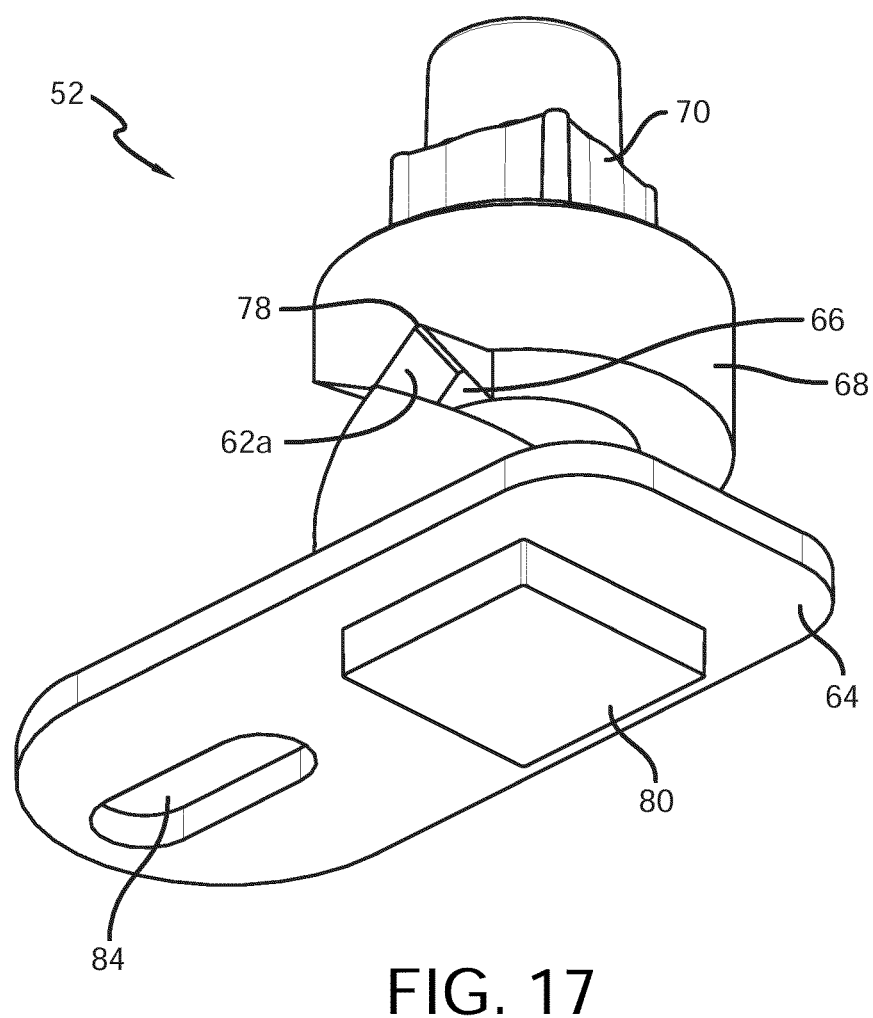
FIG. 17 is a bottom perspective view of the gravity hinge of FIG. 14 showing an upper portion of the gravity hinge in an open position, according to an exemplary embodiment.

Referring now to FIGS. 16-17, plate 66 is shown to include an alignment member 80 extending downwardly that is received into an alignment opening 82 in frame 14. Plate 64 also has an elongated slot 84 defined therein. To secure gravity hinge 52 to frame 14, a threaded fastener, such as a riv nut or clinch nut (not shown) extends through slot 84 and is threaded into an opening 86 in frame 14. Elongated slot 84 allows gravity hinge 52 a degree of adjustability. This helps prevent door sag and helps keep door 12 square or plumb as desired. It will be understood that gravity hinge 52 can be secured to frame 14 by other methods, such as welding, adhering, a threaded fastener with a nut, riveting, etc. In a preferred embodiment, upper portion 62 is comprised of a molded nylon and lower portion 60 is comprised of a metal, such as die cast zinc, stainless steel or the like.

Figure 19:
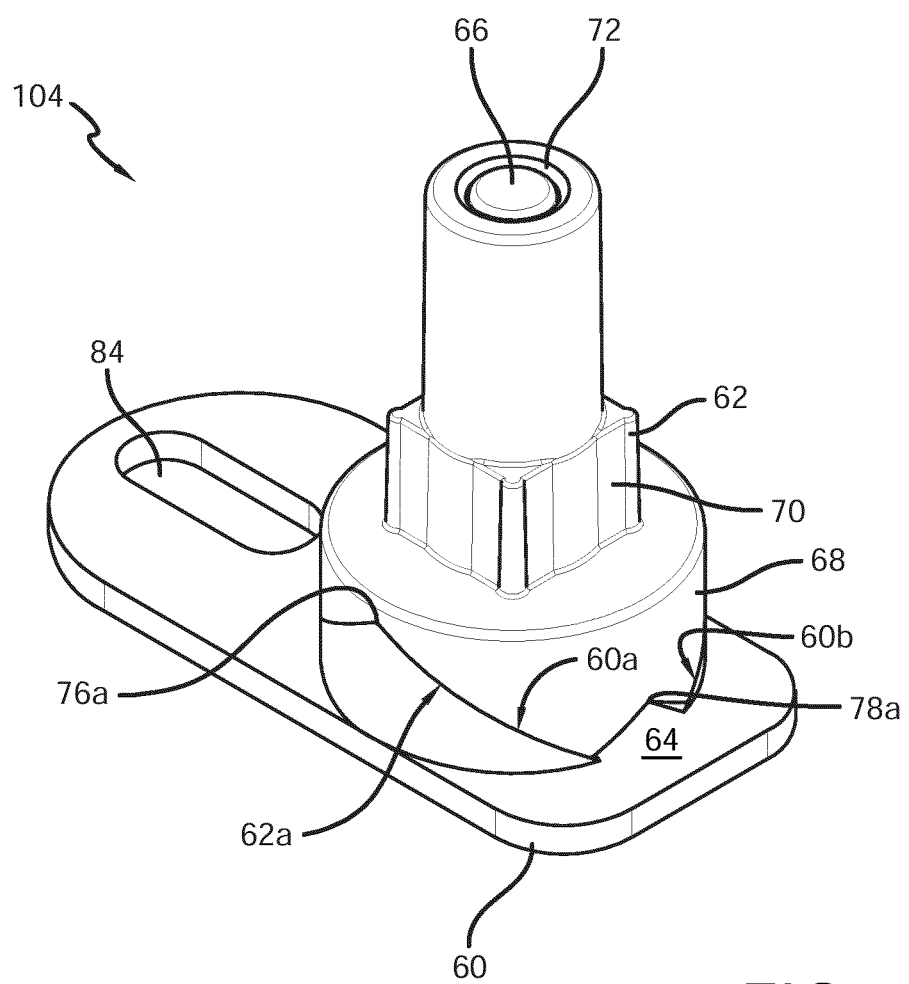
FIG. 19 is a perspective view of another gravity hinge for use with the display case door assembly of FIG. 1, according to another exemplary embodiment.
Figure 20:
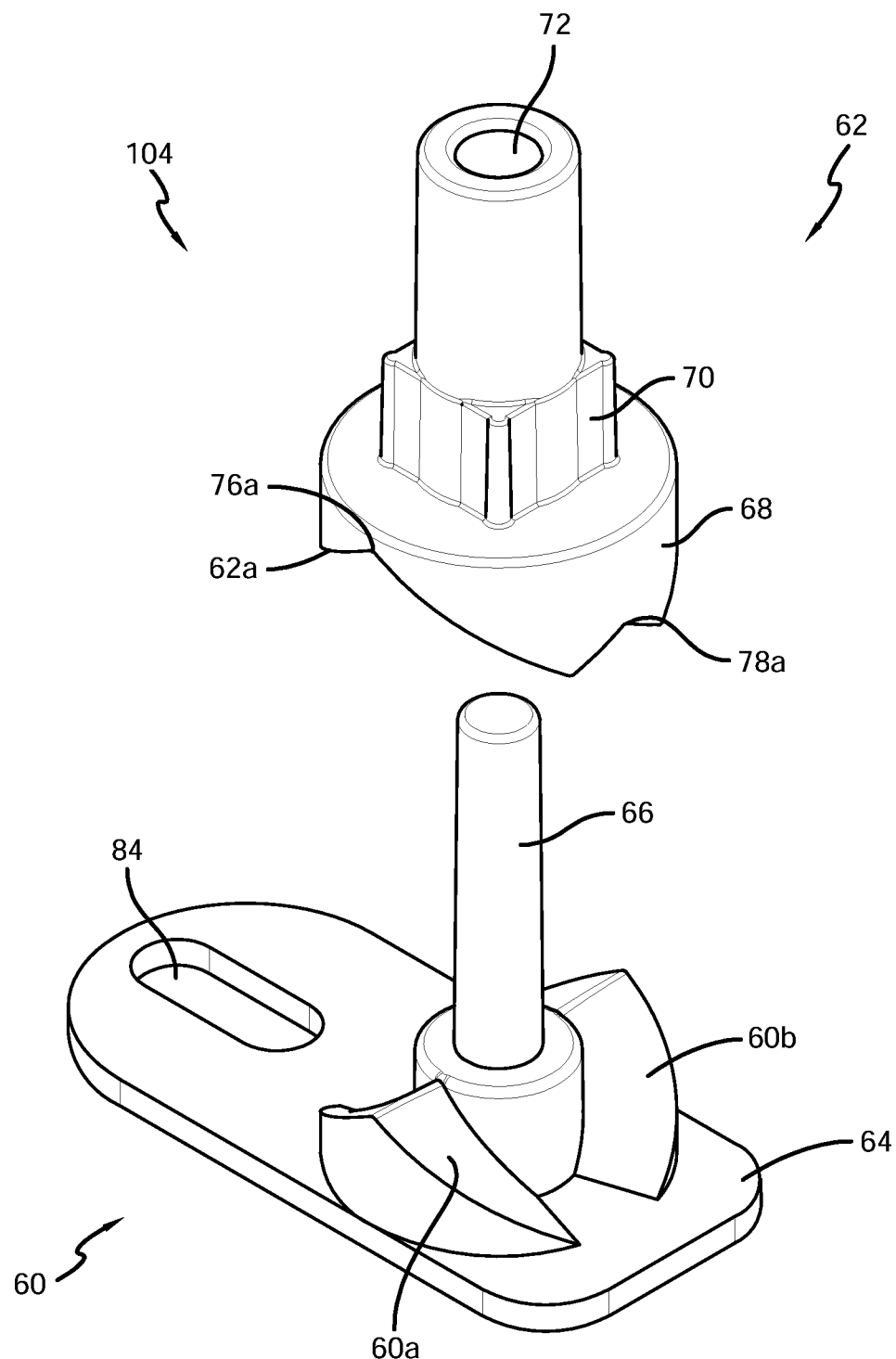
FIG. 20 is a top exploded perspective view of the gravity hinge of FIG. 19, according to an exemplary embodiment.
Figure 21:
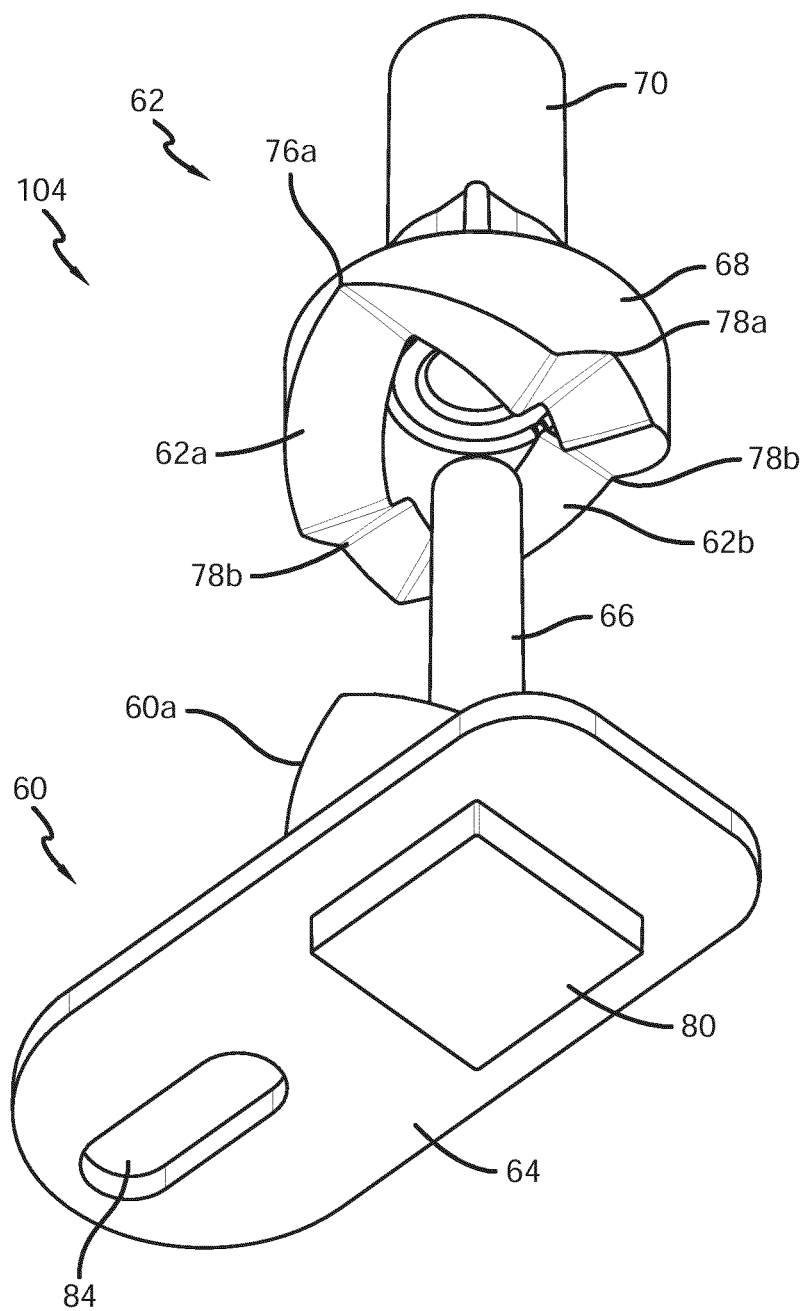
FIG. 21 is a bottom exploded perspective view of the gravity hinge of FIG. 19, according to an exemplary embodiment.

With reference to FIGS. 19-21, another embodiment of a gravity hinge 104 is shown. This gravity hinge 104 is similar to the gravity hinge 52 described above, except that the lower and upper portions 60 and 62 each include dual or first and second cam tracks 60a, 60b and 62a thereon. As shown in FIG. 21, cam tracks 62a and 62b on upper portion 62 each comprise two peaks 76a, 76b and 78a, 78b, two corresponding to the door closed position 76a, 76b and the others corresponding to the door open position 78a, 78b. These peaks or detents are sized to receive the lower portion's cam tracks 62a and 62b. FIG. 19, shows gravity hinge 104 in the closed position. Preferably, closed peaks 76a and 76b extend vertically higher than open peaks 78a and 78b. With this arrangement, when a user pushes the door from the open position toward the closed position, as a result of gravity and the potential energy stored when the door is in the open position, the door will fall to the closed position. As shown in FIGS. 19-21, in a preferred embodiment, closed peaks 76a and 76b are about 180° apart. Also, open peaks 78a and 78b are about 180° apart. This helps distribute the weight or load of the door and helps prevent door sag, damage, wear and tear, etc.

It will be understood by those skilled in the art that all of the components of display case door assembly 10, including door 12 (e.g., vacuum panel 20, rail 18, etc.), gravity hinges 52 or 104 and electrical hinge pin 54, among others, are all reversible and can be used on left hinge and right hinge doors. For example, see FIG. 15, which shows the same configuration gravity hinge 52 for left hinge and right hinge doors. In another embodiment, the components of the upper and lower portions 60, 62 of the gravity hinges can be reversed such that the concave portions of the cam track are on the lower portion, the convex portions of the cam track are on the upper portion and the axial rod extends from the upper portion, etc.

In some embodiments, gravity hinge 104 can be replaced with one or more torque hinges. The torque hinges may be configured to apply a torque to door 12 which automatically returns door 12 to a closed position. For example, the torque hinges may include internal springs (e.g., torsion springs, linear springs, etc.) which store energy when door 12 is opened and apply a closing torque to door 12 (i.e., a torque which causes door 12 to move toward the closed position). In some embodiments, the torque hinges are attached directly to vacuum panel 20. Examples of torque hinges which may be used in display case door assembly 10 include any of the torque hinges manufactured by TorqMaster International of Stamford, Conn.

Electrical Hinge Pin

Figure 13:
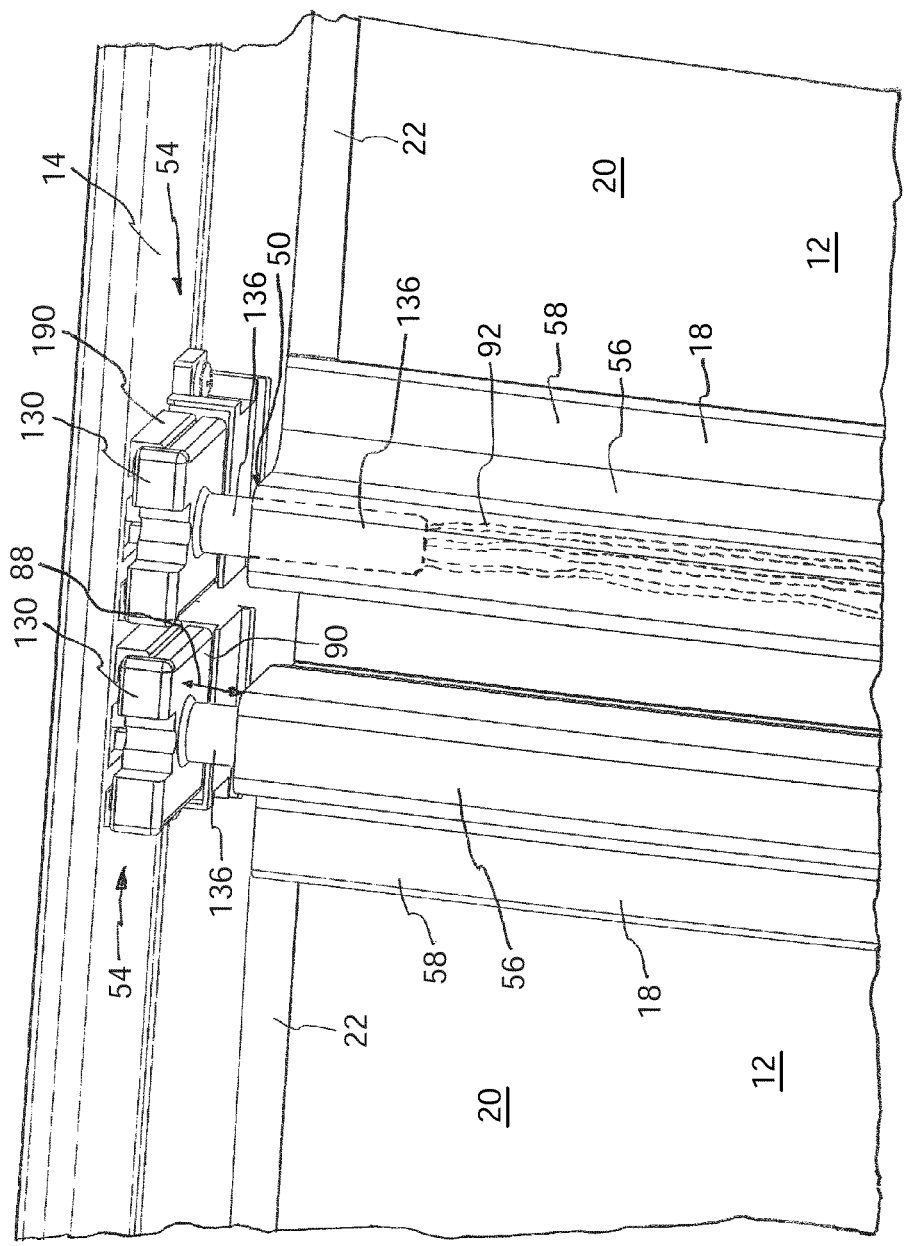
FIG. 13 is a partial interior perspective view of the assembly of FIG. 1, showing electrical hinge pins and doors, according to an exemplary embodiment.
Figure 14:
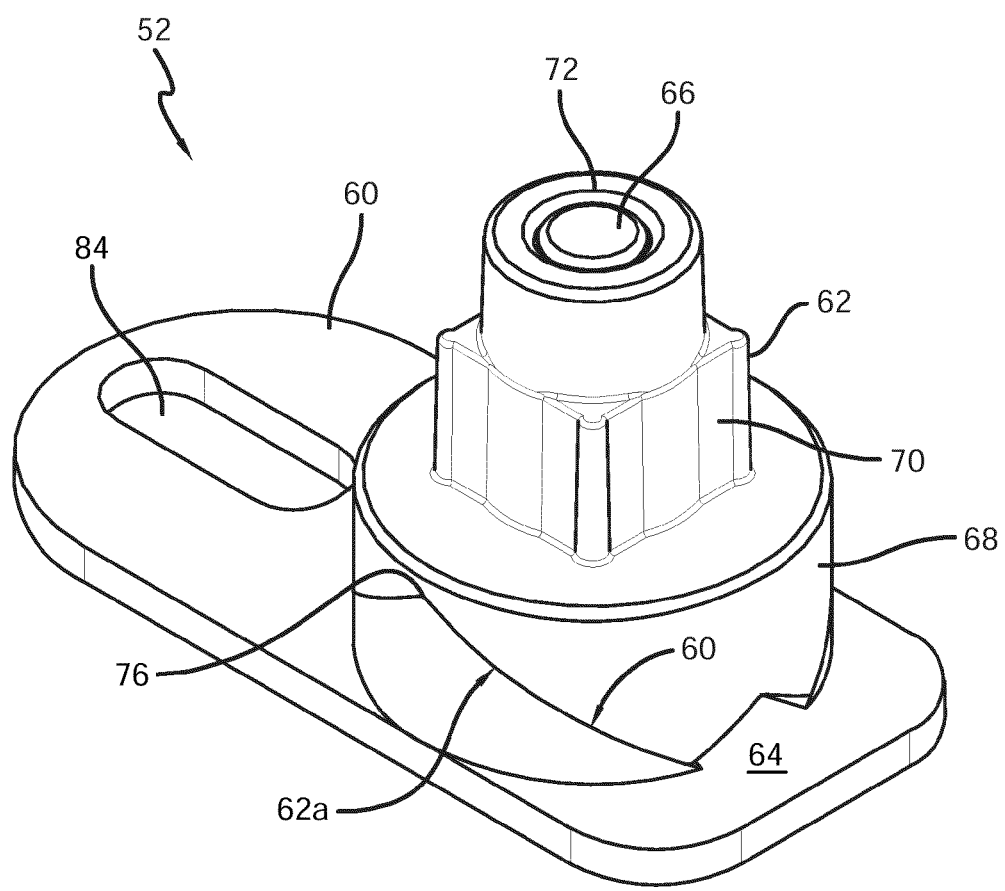
FIG. 14 is a perspective view of a gravity hinge for use with the display case door assembly of FIG. 1, according to an exemplary embodiment.
Figure 15:
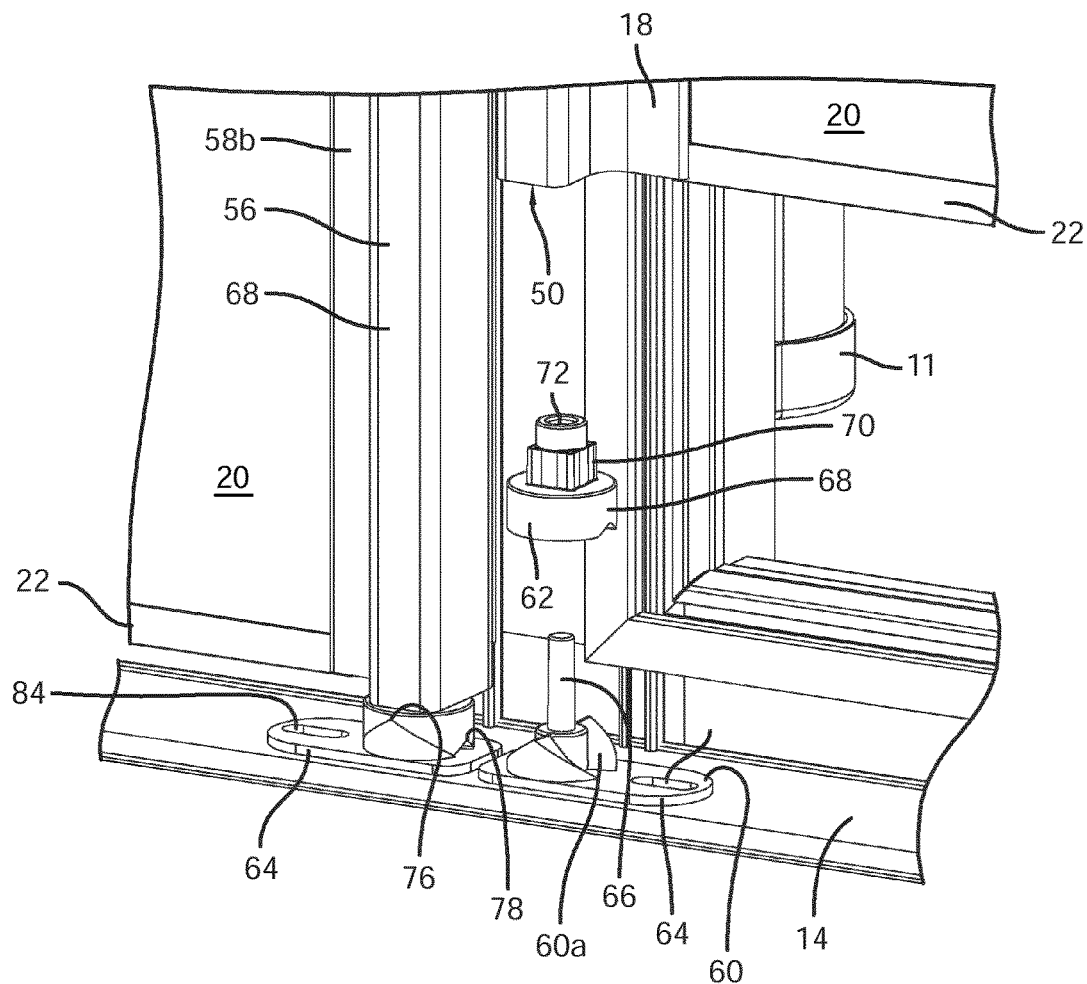
FIG. 15 is a partial interior perspective view of the assembly of FIG. 1 showing the gravity hinge of FIG. 14 exploded from the door and rail, according to an exemplary embodiment.
Figure 18:
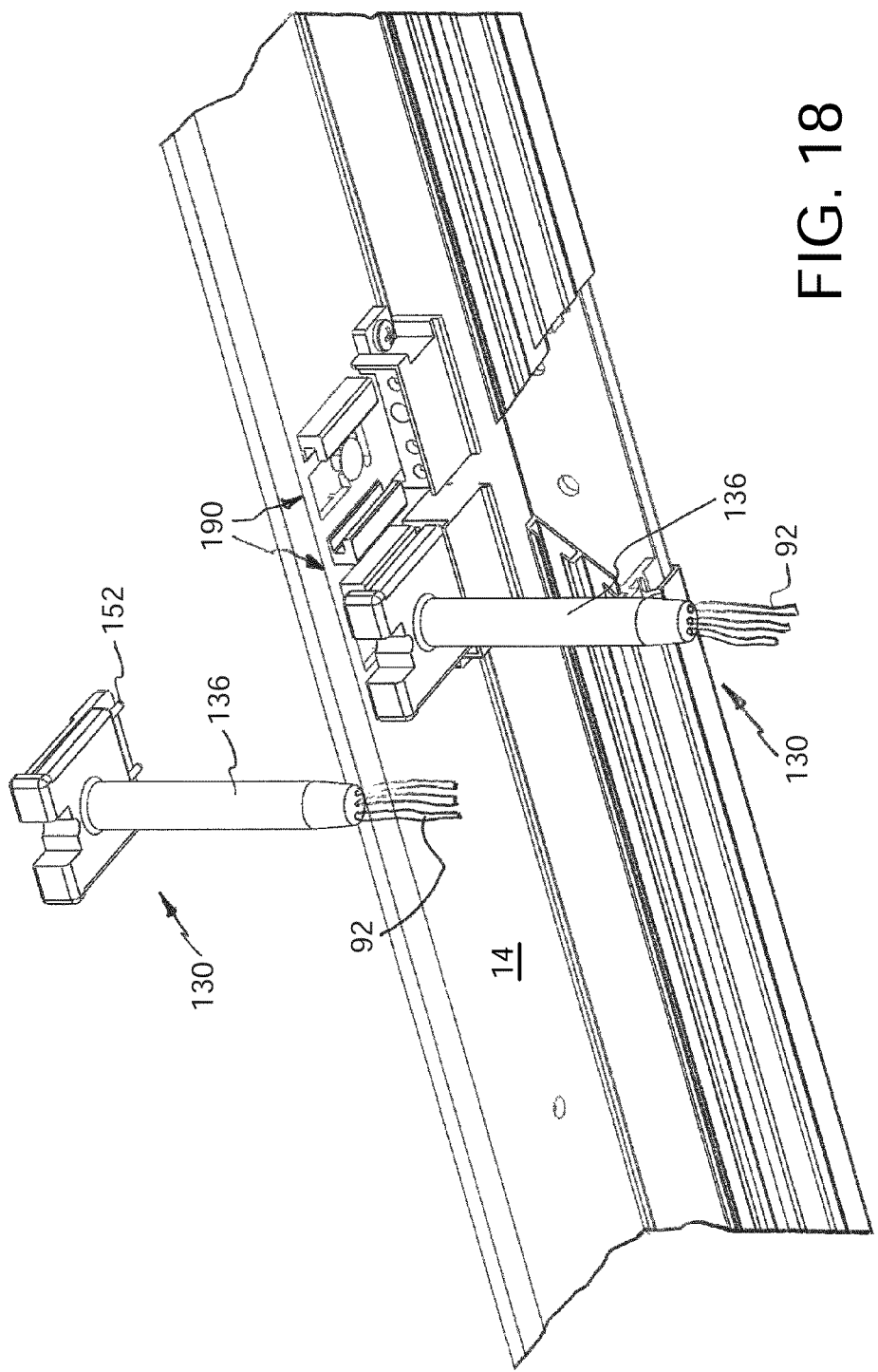
FIG. 18 is a perspective view drawing of two electrical hinge pins for use with the display case door assembly of FIG. 1, showing one of the hinge pins exploded away from a female connector, according to an exemplary embodiment.

With reference to FIGS. 13 and 18, as discussed above, the assembly preferably includes an electrical or plug in hinge pin 54 at the top thereof. For example, electrical hinge pin 54 can be that taught in U.S. Pat. No. 4,671,582 (referred to herein as "the '582 patent"), titled combined plug-in hinge pin and double ended electrical connector for a hinged appliance door, with mating receptacle and connectors, issued Jun. 9, 1987, the entirety of which is incorporated herein by reference. As shown in FIG. 18, the components identified as the combined plug-in hinge pin and double-ended electrical plug assembly 130, hinge pin part 136, male contact pin members 152, and female connector assembly 190 are numbered items 30, 36, 52, and 90 of the '582 patent.

In a preferred embodiment, there is a gap 88 between the top of rail 18. As shown in FIG. 13, gap 88 is more specifically between rail 18 and reinforcing member 90 (part of the male connection portion of electrical hinge pin 54). Gap 88 allows door 12 to travel up and down as a result of the cam action of gravity hinge 52.

As shown in FIG. 13, electrical hinge pin 54 includes a hinge pin part 136 that extends downwardly into the top opening of tunnel 50. Therefore, hinge pin part 136 and hinge pin 70 are coaxial (as a result of both extending into tunnel 50) and allow door 12 to pivot. Hinge pin part 136 houses insulated conductors 92 that extend out of the bottom of hinge pin part 136 and into tunnel 50. As shown in FIG. 10, which is a cross section of door 12, rail 18 includes a conductor opening 94 defined therein that provides communication between tunnel 50 and channel 74. For implementations in which vacuum panel 20 is powered, power can run from a wall outlet or the like, through wiring hidden in frame 14, through electrical hinge pin 54 down wires 92 extending down tunnel 51, through the conductor opening 94, into channel 74 and to solder tabs 96. Solder tabs 96 may connect with bus bars to provide power to an electro-conductive coating (e.g., on surface 29). In this arrangement, all the wires necessary to provide power to the electro-conductive coating (if any) can be hidden from view of a consumer.

In a preferred embodiment, rail 18 also includes wire access opening 98 that opens to the outside of rail 18. In this embodiment, wires 92 from electrical hinge pin 54 pass down tunnel 50 to opening 98, and wires 92 from the bus pass down channel 74, through opening 94 to opening 98 where, during assembly, electrical connections between the wires can be made externally. Once electrical hinge pin 54 and vacuum panel 20 lead connections are made, wires 92 are placed back into rail 18 and an access cover 100 is inserted in the wire access hole 98 to conceal the connections. Access cover 100 is preferably made of plastic or the like and includes tabs 102 that secure it within the opening 98 via a snap fit.

Configuration of Exemplary Embodiments

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A method of making a vacuum insulated glass panel, the method comprising:
    applying a sealing material around a perimeter of a first glass pane;
    printing a ceramic ink onto at least one of the first glass pane and a second glass pane to form a plurality of spacers;
    aligning the first glass pane and the second glass pane in parallel, overlapped relation with the sealing material in contact with the second glass pane and a space defined between the first and second glass panes;
    applying ultrasonic vibration energy to an outer surface of at least one of the first and second glass panes, thereby bonding the sealing material to the second glass pane to permanently secure the first and second glass panes together at their perimeters; and then
    drawing a vacuum in the space between the first glass pane and the second glass pane.

2. The method of claim 1, wherein applying ultrasonic vibration energy comprises pressing a sonotrode against an exterior surface of one of the first and second glass panes.

3. The method of claim 2, wherein the sonotrode is pressed with a force between 250 N and 350 N.

4. The method of claim 1, wherein at least one of the first glass pane and the second glass pane are in a tempered condition adjacent the sealing material prior to applying the ultrasonic vibration energy.

5. The method of claim 4, wherein the tempered condition is retained after application of the ultrasonic vibration energy.

6. The method of claim 1, wherein the sealing material comprises a ceramic frit.

7. The method of claim 1, wherein the sealing material is substantially lead-free.

8. The method of claim 1, wherein the plurality of spacers are arranged in a grid and separated from each other by a distance greater than 50 millimeters.

9. The method of claim 1, wherein the space between the first glass pane and the second glass pane is less than 1 mm.

10. The method of claim 1, further comprising laminating a film to a surface of at least one of the first glass pane and the second glass pane.

11. The method of claim 10, wherein the film comprises at least one of an anti-condensate layer, an ultraviolet inhibiting layer, and a low emissivity layer.

12. The method of claim 1, further comprising placing a getter material in the space between the first glass pane and the second glass pane.

13. The method of claim 1, wherein applying ultrasonic vibration energy to the outer surface of at least one of the first and second glass panes bonds the sealing material to the first glass pane and the second glass pane.

* * * * *